(12) United States Patent
Kuwata et al.

(10) Patent No.: US 6,535,301 B1
(45) Date of Patent: Mar. 18, 2003

(54) IMAGE PROCESSING APPARATUS, IMAGE PROCESSING METHOD, IMAGE PROCESSING PROGRAM RECORDING MEDIUM, COLOR ADJUSTMENT METHOD, COLOR ADJUSTMENT DEVICE, AND COLOR ADJUSTMENT CONTROL PROGRAM RECORDING MEDIUM

(75) Inventors: Naoki Kuwata, Nagano-ken (JP); Yoshihiro Nakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/097,828

(22) Filed: Jun. 16, 1998

(30) Foreign Application Priority Data

Jun. 17, 1997 (JP) .............................. 9-160158
Nov. 13, 1997 (JP) .............................. 9-312126

(51) Int. Cl.⁷ .............................. G06F 15/00; G03F 3/08
(52) U.S. Cl. .................................. 358/1.9; 358/520
(58) Field of Search .................... 358/1.9, 1.1, 504, 358/518, 515, 520, 523, 527, 531, 537; 382/167, 162

(56) References Cited

U.S. PATENT DOCUMENTS

| | | | | |
|---|---|---|---|---|
| 4,975,861 A | | 12/1990 | Fujimoto | 364/521 |
| 5,012,333 A | * | 4/1991 | Lee et al. | 358/80 |
| 5,105,267 A | | 4/1992 | Hayashi | 358/80 |
| 5,130,935 A | * | 7/1992 | Takiguchi | 364/526 |
| 5,187,570 A | * | 2/1993 | Hibi et al. | 358/80 |
| 5,289,295 A | * | 2/1994 | Yumiba et al. | 358/518 |
| 5,497,431 A | | 3/1996 | Nakamura | 382/162 |
| 5,717,839 A | * | 2/1998 | Ichikawa | 395/109 |
| 5,754,222 A | * | 5/1998 | Daly et al. | 348/184 |

FOREIGN PATENT DOCUMENTS

| | | | |
|---|---|---|---|
| EP | 0 354 490 | 2/1990 | H04N/1/46 |
| EP | 0 377 386 | 7/1990 | H04N/1/40 |
| EP | 0 441 558 | 8/1991 | G06F/15/72 |
| EP | 0 481 525 | 4/1992 | H04N/1/46 |
| EP | 0 723 364 | 7/1996 | H04N/1/60 |

\* cited by examiner

*Primary Examiner*—Madeleine Nguyen
(74) *Attorney, Agent, or Firm*—Sughrue Mion, PLLC

(57) ABSTRACT

A color adjustment device performs color separation of color image data for each predetermined element color and enhances the color image data to provide each desired color in the output. A chromaticity judging unit determines a chromaticity value of each pixel according to the color image data. An object chromaticity pixel statistical calculation unit performs statistical calculations on pixels having chromaticity values determined by the chromaticity judging unit to meet a predetermined chromaticity range. A color adjustment degree judging unit determines a degree of color adjustment to eliminate a difference between a predetermined optimum value for pixels that meet the predetermined chromaticity range, and a result value attained in the statistical calculation. The color adjustment degree judging unit also regulates the degree of color adjustment according to an occupancy ratio, of pixels subjected to the statistical calculation to the total number of pixels. A color adjusting unit carries out the color adjustment of the image data according to the regulated degree of color adjustment.

6 Claims, 30 Drawing Sheets

Fig. 9

| Region reference table | | | |
|---|---|---|---|
| Upper left corner coordinates | Lower right corner coordinates | Kind of processing | Level of adjustment |
| $(x_{10}, y_{10})$ | $(x_{11}, y_{11})$ | 1 | +1 |
| $(x_{20}, y_{20})$ | $(x_{21}, y_{21})$ | 2 | +3 |
| $(x_{30}, y_{30})$ | $(x_{31}, y_{31})$ | 3 | −1 |
| ⋮ | ⋮ | ⋮ | ⋮ |

Fig. 16

| y | Y |
|---|---|
| 0 | 0 |
| ymin | 5 |
| ⋮ | ⋮ |
| ymax | 250 |
| 255 | 255 |

| | i=-2 | -1 | 0 | 1 | 2 |
|---|---|---|---|---|---|
| j=-2 | 0 | 2 | 4 | 2 | 0 |
| -1 | 2 | 20 | 46 | 20 | 2 |
| 0 | 4 | 46 | 100 | 46 | 4 |
| 1 | 2 | 20 | 46 | 20 | 2 |
| 2 | 0 | 2 | 4 | 2 | 0 |

Color adjustment object selection

● Flesh color adjustment
[For clearer flesh color]

○ Green color adjustment
[For more vivid green color of tree leaves]

○ Blue color adjustment
[For clearer sky-blue color]

| OK | CANCEL | ion correction, and brightness correction, for example. Each pixel of image data is converted according to predetermined correspondence relationship information in these conventional image processing techniques. In an example of chromaticity correction, a color conversion table is prepared beforehand, and when original image data is input, the color conversion table is referenced to produce output image data. Thus, in flesh color correction, for example, a flesh color part of an image is made vivid on output.

IMAGE PROCESSING APPARATUS, IMAGE PROCESSING METHOD, IMAGE PROCESSING PROGRAM RECORDING MEDIUM, COLOR ADJUSTMENT METHOD, COLOR ADJUSTMENT DEVICE, AND COLOR ADJUSTMENT CONTROL PROGRAM RECORDING MEDIUM

BACKGROUND OF THE INVENTION

1. Field of the Invention

The present invention relates to an image processing apparatus, an image processing method and an image processing program recording medium for inputting digital photographic image data containing dot-matrix pixels and converting each pixel of the image data according to predetermined correspondence relationship information, and it is also concerned with a color adjustment method, a color adjustment device and a color adjustment control program recording medium for carrying out optimum color adjustment.

2. Description of Related Art

There are a variety of conventional image processing techniques for processing digital photographic image data, more specifically such image processing techniques for contrast enhancement, chromaticity correction, and brightness correction, for example. Each pixel of image data is converted according to predetermined correspondence relationship information in these conventional image processing techniques. In an example of chromaticity correction, a color conversion table is prepared beforehand, and when original image data is input, the color conversion table is referenced to produce output image data. Thus, in flesh color correction, for example, a flesh color part of an image is made vivid on output.

In conventional image processing techniques mentioned above, however, when correction of certain chromaticity is made, an entire image may be affected by the correction, causing an unsatisfactory result of image adjustment. For instance, if it is attempted to make a pallid complexion of a person's image look ruddy, an entire image may become reddish. Namely, although a certain kind of image adjustment provides a desired effect on an image, it may cause an undesired side effect thereon.

SUMMARY OF THE INVENTION

It is therefore an object of the present invention to provide an image processing apparatus which is capable of minimizing an adverse side effect in adjustment of an image data.

In accomplishing this object of the present invention and according to one aspect thereof, there is provided an image processing apparatus for inputting photographic image data containing dot-matrix pixels and converting each pixel of the image data according to predetermined correspondence relationship information, which comprises the correspondence relationship holding unit which holds a plurality of correspondence relationship information of the image data in combination with applicable object information thereof, the correspondence relationship judging unit which judges each correspondence relationship for converting each pixel of the image data according to the correspondence relationship and applicable object information which are held by the correspondence relationship holding unit, and the image data converting unit which converts each pixel of the image data by referencing each correspondence relationship judged by the correspondence relationship judging unit from the correspondence relationship holding unit.

Where an image contains dot-matrix pixels and each pixel is indicated in image data representation, each pixel of image data is converted according to predetermined correspondence relationship information in the above-mentioned arrangement of the present invention. In this image processing, a plurality of correspondence relationship information for image data conversion and applicable object information are held in combination. According to these information, a judgment is formed on each correspondence relationship for conversion of each pixel of image data, and based on result of judgment, conversion of each pixel of image data is carried out.

More specifically, there are provided plural correspondence relationships for image data conversion, and it is judged which correspondence relationship is to be applied to each pixel. Then, image data conversion is performed by applying a proper correspondence relationship to each pixel. For example, a correspondence relationship for making green color of tree leaves more vivid is applied to green color pixels indicating tree leaves, and a correspondence relationship for making a complexion ruddy is applied to flesh color pixels. In this manner, each correspondence relationship is flexibly applied as required.

In accordance with the present invention, since correspondence relationship information for image data conversion can be changed for each pixel, it is possible to provide an image processing method which allows execution of desired image processing without giving an adverse effect to unspecified parts of an image.

It will be obvious to those skilled in the art that the image processing method in which plural correspondence relationship information can be changed for each pixel is practicable not only in a substantial apparatus, but also in a system on its method. From this point of view, the present invention provides an image processing apparatus of inputting photographic image data containing dot-matrix pixels and converting each pixel of the image data according to predetermined correspondence relationship information, in which a plurality of correspondence relationship information for conversion of the image data and applicable object information thereof are held in combination, each correspondence relationship for converting each pixel of the image data is judged according to the correspondence relationship and applicable object information thus held, and each pixel of the image data is converted according to result of judgment.

The present invention for realizing image processing as mentioned above may be practiced in a variety of forms, i.e., it may be embodied in hardware, software or combination thereof in various arrangements that are modifiable as required. As an example of practicing the present invention, it may be embodied in image processing software. In this case, according to the present invention, there is provided a software storage medium for recording the image processing software. From this viewpoint, the present invention provides a storage medium for recording an image processing program for inputting photographic image data containing dot-matrix pixels on a computer and converting each pixel of the image data according to predetermined correspondence relationship information, the image processing program comprising the steps of; holding a plurality of correspondence relationship information for conversion of the image data in combination with applicable object information thereof, forming judgment on each correspondence relationship for converting each pixel of the image data according to the correspondence relationship and applicable object information thus held, and converting each pixel of the image data according to result of judgment thus formed. In this case, the same functionalities as in the foregoing description can be provided.

The storage medium for recording the image processing program may be a magnetic storage medium, a magneto-optical storage medium or any software storage medium to be developed in the future. Obviously, the present invention embodied in image processing software may take such a replicated form as a primary replicated product, secondary replicated product, etc. In addition, the image processing software according to the present invention may be supplied through use of a communication line or in a form of contents written in a semiconductor chip.

Still more, there may be provided such an arrangement that some parts of the present invention are embodied in software while the other parts thereof are embodied in hardware. In a modified embodiment of the present invention, some parts thereof may be formed as software recorded on a storage medium to be read into hardware as required.

In image processing according to the present invention, photographic image data is particularly suitable as object data to be processed. However, it is not necessarily required to use 100% photographic image data as object data, and semi-synthetic image data or composite-photographic image data produced from plural photographic images may be used as object data.

As stated above, in accordance with the present invention, there are provided a plurality of correspondence relationships in combination with applicable object information thereof. Each correspondence relationship is used to perform specific conversion of input image data, and for each correspondence relationship, there is provided applicable object information thereof. It is to be understood that such applicable object information may take a variety of forms.

Another object of the present invention is to provide an image processing method of using applicable object information.

According to the present invention, there is provided an image processing apparatus wherein, in the correspondence relationship information holding unit, each correspondence relationship applicable to each part of image is held along with information on each part applicable to each correspondence relationship, and wherein, in the correspondence relationship judgment means, a part of image corresponding to each pixel is detected and each correspondence relationship for conversion is judged through comparing the detected part of image with part information for each correspondence relationship.

In the above-mentioned arrangement of the present invention, a unique correspondence relationship is applicable to each part of image, and there is provided part information applicable to each correspondence relationship. Therefore, a part of image corresponding to each pixel is detected, and the detected part of image is compared with part information for each correspondence relationship. Thus, if a match is found, image data conversion is carried out using relevant correspondence relationship information.

More specifically, a unique correspondence relationship is provided for each part of image and it is applied to image data to be converted. For instance, a correspondence relationship for sky-blue color is applied to an upper part of image, while performing no conversion on a lower part of image. In this case, a part of image is not limited in its size and shape, and it may take any shape such as a rectangular shape, round shape, free shape, etc. Furthermore, it is not necessarily required to specify a part of image in a particular range. A part of image may be specified with respect to a certain center point. In this case, a degree of adjustment in image conversion may be decreased gradually as being apart from the center point. Obviously, a certain correspondence relationship may be applied to a plurality of parts of image.

As stated above, in accordance with the present invention, since each correspondence relationship is changed with each part of image, it is possible to carry out image processing with a particular location specified, thereby permitting easy operation.

Another object of the present invention is to provide an image processing method of specifying an applicable object.

According to the present invention, there is provided an image processing apparatus wherein, in the correspondence relationship information holding unit, a plurality of correspondence relationships are held along with information on chromaticity applicable to each correspondence relationship, and wherein, in the correspondence relationship judgment means, a value of chromaticity of each pixel is detected and each correspondence relationship for conversion is judged through comparing the detected value of chromaticity with information on chromaticity for each correspondence relationship.

In the above-mentioned arrangement of the present invention, a unique correspondence relationship is applicable to each level of chromaticity. Therefore, a value of chromaticity of each pixel is detected, and the detected value of chromaticity is compared with information on chromaticity for each correspondence relationship in judgment on each correspondence relationship for conversion. In this case, chromaticity is used for the purpose of judgment on applicability of each correspondence relationship, i.e., it is not necessarily required to adjust a level of chromaticity.

In accordance with the present invention, since an object can be selected using chromaticity, its embodiment is relatively easy even if pixels to be processed are located at a plurality of parts of image.

In chromaticity judgment, input image data may be used intactly, or a color space scheme is changed before judgment so that input image data is converted into data easy for judgment on chromaticity. Still more, it is not necessarily required to use a narrow definition of chromaticity. Chromaticity judgment may be made in a wider definition by using a level of any predetermined recognizable characteristic of image data.

It is possible to adopt various units for setting correspondence relationship information for image data conversion.

Another object of the present invention is to provide an image processing apparatus of using a color conversion table.

According to the present invention, there is provided an image processing method wherein, in the step of holding the correspondence relationship information, a color conversion table is used for storing information on correspondence relationship between pre-converted original image data and post-converted image data.

In the above-mentioned arrangement of the present invention, the color conversion table retains pre-converted image data and post-converted image data. By referencing the color conversion table using pre-converted image data, it is possible to attain post-converted image data, i.e., correspondence relationship information is stored in a form of table.

Besides, it is possible to hold correspondence relationship information in such forms as arithmetic expressions, arithmetic parameters, etc. However, in use of a table form, there is an advantage that operations can be simplified since just referencing is required.

As stated above, in accordance with the present invention, since correspondence relationship information is held in the color conversion table, it is relatively easy to carry out image data conversion.

As to a plurality of correspondence relationships, it is not necessarily required to provide different kinds of correspondence relationships.

Another object of the present invention is to provide an image processing apparatus of attaining results of plural conversions substantially.

According to the present invention, there is provided an image processing apparatus wherein, in the correspondence relationship information holding unit, a plurality of correspondence relationships are realized by changing a degree of correspondence relationship applicability.

In the above-mentioned arrangement of the present invention, a plurality correspondence relationships are set up by changing a degree of correspondence relationship applicability. For example, according to a degree of applicability, relational association can be made between image data not applied to a certain level of correspondence relationship and image data applied thereto. In this case, either linear or non-linear relational association may be made.

Still more, in use of such a degree of applicability, just a single correspondence relationship can set up a condition converted by applying the correspondence relationship and a condition not converted substantially, i.e., it is possible to provide a plurality of correspondence relationships. In this case, more correspondence relationships can be realized by changing a degree of applicability as required.

As stated above, in accordance with the present invention, it is possible to rearrange a single correspondence relationship as a plurality of correspondence relationships by changing a degree of applicability.

Another object of the present invention is to provide an image processing method of holding a plurality of correspondence relationships which may be predetermined or specified as required.

According to the present invention, there is provided an image processing apparatus wherein, the correspondence relationship information holding unit includes the correspondence relationship specifying unit in which a plurality of correspondence relationships applicable to the image data are specified in succession as required.

In the above-mentioned arrangement of present invention, a plurality of correspondence relationships to be applied to the image data are specified in succession. There are two kinds of correspondence relationship elements; a condition to be converted, and an object to be applied. Either one or both of these kinds of elements may be taken. In this case, it is also possible to specify a part of each image and select a conversion condition for the specified part of image. Still more, there may be provided such an arrangement that a flesh color adjustment item or a sky-blue color adjustment item is selectable as an optional function of image processing.

As stated above, in accordance with the present invention, since applicable correspondence relationships can be specified as required, it is possible to improve a degree of freedom in image processing.

Another object of the present invention is to provide an image processing apparatus of holding each correspondence relationship for adjusting brightness.

According to the present invention, there is provided an image processing apparatus wherein, in the correspondence relationship information holding unit, each correspondence relationship for adjusting brightness of the image data is held.

In the above-mentioned arrangement of the present invention, each correspondence relationship for adjusting brightness according to the image data is held, and brightness of predetermined pixels is adjusted using the correspondence relationship thus held. For example, on a certain part of image, brightness of pixels thereof is increased.

As stated above, in accordance with the present invention, it is possible to adjust brightness on a part of image based on applicable correspondence relationship information.

Another object of the present invention is to provide an image processing apparatus of holding each correspondence relationship for adjusting chromaticity.

According to the present invention, there is provided an image processing apparatus wherein, in the correspondence relationship information holding unit, each correspondence relationship for adjusting chromaticity according to the image data is held.

In the above-mentioned arrangement of the present invention, each correspondence relationship for adjusting chromaticity according to the image data is held, and chromaticity of predetermined pixels is adjusted using the correspondence relationship thus held. For example, on a part of image containing flesh color pixels, enhancement is made to provide ruddy flesh color.

As stated above, in accordance with the present invention, it is possible to adjust chromaticity on a part of image based on applicable correspondence relationship information.

Another object of the present invention is to provide an image processing apparatus of adjusting color vividness.

According to the present invention, there is provided an image processing apparatus wherein, in the correspondence relationship information holding unit, each correspondence relationship for adjusting color vividness according to the image data is held.

In the above-mentioned arrangement of the present invention, each correspondence relationship for adjusting color vividness according to the image data is held, and vividness of predetermined pixels is adjusted using the correspondence relationship thus held. For example, to enhance color of any subject on a surrounding background, color adjustment is made so that the color of the subject becomes more vivid.

As stated above, in accordance with the present invention, it is possible to adjust color vividness on a part of image based on applicable correspondence relationship information.

If it is distinguished clearly whether a predetermined correspondence relationship is to be applied or not, a conspicuous boundary may take place in an image. Therefore, another object of the present invention is to make such a boundary unrecognizable by providing an image processing apparatus for adjusting a level of correspondence relationship gradually.

According to the present invention, there is provided an image processing apparatus wherein, in the image data conversion unit, for pixels in a transition region between regions which are different in terms of correspondence relationship, a level of correspondence relationship is adjusted gradually.

In the above-mentioned arrangement of the present invention, a transition region is provided between regions which are different in terms of correspondence relationship, and for pixels in the transition region, a level of correspondence relationship is adjusted gradually in image data conversion, thereby eliminating a stepwise difference in a processed image.

As stated above, in accordance with the present invention, it is possible to suppress occurrence of a stepwise difference on a boundary between regions to which different correspondence relationships are applied respectively in an image.

A level of correspondence relationship to be adjusted gradually in a transition region is selectable as required, and either linear or non-linear transition may be applied.

As mentioned in the foregoing description, correspondence relationship information for image data conversion can be used for color adjustment. However, as to selection of an element color and a degree of enhancement, it is required for a human operator to make a decision. In color adjustment processing of digital image data, it is difficult to identify which part will cause conspicuous color deviation in advance.

For instance, in case of a color image of a building, color deviation will not be recognized as long as an original color thereof is unknown. However, in case of a flesh color image of a person's face, an original color thereof can be presumed in most cases. Therefore, adjustment of flesh color in an image is performed by the operator so that natural flesh color is given.

In color adjustment, there is a problematic factor which is referred to as a memory color effect in psychology. When a lemon is photographed as a subject, for example, a color of a photographed lemon image looks slightly somber even if it meets a color of the actual lemon in measurement using a colorimeter. Agreement between the color of the lemon image and that of the actual lemon cannot be found unless a side-by-side comparison check is made. Due to a memory color effect in psychology, a person memorizes that a color of a lemon is vivid in general. However, an actual lemon does not have such a vivid color as is memorized. Therefore, even if a lemon image is corrected to have its actual color, it is not satisfactory in terms of visual sensation in psychology. In case of flesh color, green color of tree leaves and blue color of sky, a memory color effect tends to occur as stated above.

When a person conducts adjustment of flesh color, for example, a degree of flesh color enhancement is determined in an appropriate range though the flesh color does not exactly match its memory color. If the flesh color is adjusted to exactly match its memory color, deviation will occur in other colors.

Therefore, automatic color adjustment cannot be performed just by predetermining correspondence relationship information. Even in automatic color adjustment, it is rather difficult to attain satisfactory result due to a memory color effect, i.e., a person must readjust result of automatic color adjustment.

It is another object of the present invention to provide a color adjustment device, a color adjustment method and a storage medium for recording a color adjustment control program for carrying out optimum color adjustment processing automatically while taking account of such factors as a memory color effect.

According to the present invention, there is provided a color adjustment device for performing color separation of color image data for each predetermined element color and adjusting the color image data in enhancement to provide each desired color in result of color image output delivered for each element color by such a device as an image output device, etc., comprising; the chromaticity judging unit which determines a value of chromaticity of each pixel according to the color image data, the object chromaticity pixel statistical calculation unit which performs statistical calculation on pixels having chromaticity values which have been determined to meet a predefined range of chromaticity by the chromaticity judging unit, the color adjustment degree judging unit which determines a degree of color adjustment so as to eliminate a difference between a predetermined optimum value for pixels meeting the predefined range of chromaticity and a result value attained in the statistical calculation and for regulating the degree of color adjustment according to an occupancy ratio of pixels subjected to statistical calculation to the total number of pixels, and the color adjusting unit which carries out color adjustment of the image data according to the regulated degree of color adjustment.

In the above-mentioned arrangement of the present invention, a value of chromaticity of each pixel is determined according to the color image data. Since a value of chromaticity represents an absolute ratio in psychophysical color specification which does not depend on brightness, important parts (objects) in an image can be identified according to possible ranges of chromaticity. For example, an object can be distinguished by checking whether its chromaticity value is in a possible chromaticity range of flesh color or green color of tree leaves. Based on this principle of chromaticity, if determined chromaticity values of pixels are in a predefined chromaticity range, statistical calculation is performed on these pixels. In the above example, if determined chromaticity values of pixels are in the possible chromaticity range of flesh color, they are subjected to statistical calculation. For statistical calculation, an average value, median, etc. may be taken. Statistical calculation on pixels having chromaticity in a predefined range with respect to all the pixels of an image is analogous to a situation that a person judges an average level of flesh color with respect to flesh-color-like pixels.

Then, it is necessary to judge whether or not a particular color matches its memory color. A degree of color adjustment is so determined as to eliminate a difference between a predetermined optimum value for pixels meeting a predefined range of chromaticity and a result value attained in the statistical calculation. However, if a degree of color adjustment thus determined is applied intactly, a flesh color part will be adjusted to have memory flesh color, for example, but non-allowable color deviation will occur on other color parts. Therefore, the degree of color adjustment thus determined is regulated according to an occupancy ratio of pixels subjected to the statistical calculation to the total number of pixels. In this manner, color adjustment is made properly so that adjustment of flesh color will not cause an excessive change in other colors. Thus, the image data is color-adjusted according to the regulated degree of color adjustment.

As stated above, in accordance with the present invention, it is possible to provide a color adjustment method which enables automatic color adjustment processing through chromaticity statistical calculation for simulating human judgment.

It is to be understood that a method of performing statistical calculation on pixels having chromaticity in a predefined range and reflecting result of statistical calculation in a degree of color adjustment is practicable in a substantial apparatus for its implementation. From this point of view, the present invention provides a color adjustment device for performing color separation of color image data for each predetermined element color and adjusting the color image data in enhancement to provide each desired color in result of color image output delivered for each element color by such a device as an image output device, etc., comprising the steps of; determining a value of chromaticity of each pixel according to the color image data, performing statistical calculation on pixels having chromaticity values which have been determined to meet a predefined range of chromaticity, determining a degree of color adjustment so as to eliminate a difference between a predetermined optimum value for pixels meeting the predefined range of chromaticity and a result value attained in the statistical calculation, regulating the degree of color adjustment according to an occupancy ratio of pixels subjected to the statistical calculation to the total number of pixels, and carrying out color adjustment of the image data according to the regulated degree of color adjustment.

As an example of practicing the present invention, it may be embodied in color adjustment control software for a color adjustment device. In this case, according to the present invention, there is provided a software storage medium for recording the color adjustment control software. From this viewpoint, the present invention provides a storage medium for recording a color adjustment control program for performing color separation of color image data for each predetermined element color on a computer and adjusting the color image data in enhancement to provide each desired color in result of color image output delivered for each element color by such a device as an image output device, etc., the color adjustment control program comprising the steps of; determining a value of chromaticity of each pixel according to the color image data, performing statistical calculation on pixels having chromaticity values which have been determined to meet a predefined range of chromaticity, determining a degree of color adjustment so as to eliminate a difference between a predetermined optimum value for pixels meeting the predefined range of chromaticity and a result value attained in the statistical calculation, regulating the degree of color adjustment according to an occupancy ratio of pixels subjected to the statistical calculation to the total number of pixels, and carrying out color adjustment of the image data according to the regulated degree of color adjustment. In this case, the same functionalities as in the foregoing description can be provided.

In determining chromaticity of each pixel of color image data, chromaticity conversion is performed taking account of a color space coordinate scheme used for original color image data. In this case, chromaticity is used intactly if it is a direct element, or chromaticity is converted if it is not a direct element. For conversion, a conversion table or a conversion expression may be used. In this case, it is not necessarily required to attain an accurate value in result, i.e., an error maybe contained if its adverse effect is insignificant.

When determined chromaticity values of pixels are in a predefined chromaticity range, statistical calculation is performed on these pixels. In this case, it is not necessarily required to make an alternative-choice judgment, i.e., it is not necessarily required to determine whether the predefined chromaticity range is satisfied or not. Instead, statistical calculation may be made while changing a weight factor.

A variety of statistical calculation approaches may be used in application.

Another object of the present invention is to provide a color adjustment method which is advantageous in the amount of calculation.

According to the present invention, there is provided a color adjustment device wherein: in object chromaticity pixel statistical calculation unit, an average value of pixels judged to be object pixels is calculated for each element color of color image data; and in color adjustment degree judging unit, an optimum value of each element color is provided for color image data meeting the predefined range of chromaticity, and a degree of color adjustment is determined according to the optimum value of each element color.

In the above-mentioned arrangement of the present invention, statistical calculation is performed for each element color of color image data to determine an average value of pixels judged to be object pixels, i.e., statistical calculation is carried out using each element color of color image data instead of chromaticity statistical calculation. On the other hand, an optimum value of each element color is provided for color image data meeting the predefined range of chromaticity. In judgment of a degree of color adjustment, comparison for each element color is performed, and a difference attained is used as a degree of element color adjustment.

In accordance with the present invention, it is judged from chromaticity whether or not an objet is applicable to statistical calculation. Since statistical calculation is performed for each element color of color image data, statistical result can be used easily in subsequent arithmetic operations.

Besides, it is possible to use median calculation, standard deviation calculation, etc. though the amount of calculation increases in statistics.

A range of chromaticity to be subjected to statistical calculation can be changed as required.

Another object of the present invention is to provide a color adjustment device which is suitable for memory color adjustment.

According to the present invention, there is provided a color adjustment device wherein, in the object chromaticity pixel statistical calculation unit, statistical calculation is performed on object chromaticity pixels in a possible range of chromaticity in terms of memory color in psychology.

In the above-mentioned arrangement of the present invention, statistical calculation is performed on object chromaticity pixels which meet a possible range of chromaticity in terms of memory color in psychology. In this case, it is not necessarily required to attain statistical result using just one possible range of chromaticity. It is possible to carry out a plurality of statistical calculations respectively by specifying plural possible chromaticity ranges.

In accordance with the present invention, since calculation is performed on pixels corresponding to memory color, a degree of color adjustment is regulated according to the number of pixels, thereby making it possible to form a judgment similar to that by a person.

In judgment of a degree of color adjustment, a degree of color adjustment is so determined as to eliminate a difference between a predetermined optimum value for pixels meeting a predefined range of chromaticity and a result value attained in the statistical calculation, and the degree of color adjustment is regulated according to an occupancy ratio of pixels subjected to statistical calculation to the total number of pixels. In this case, it is not necessarily required to carry out these two steps of processing. It is just required to provide the same result of processing. For example, if a difference between a predetermined optimum value for pixels meeting a predefined range of chromaticity and a result value attained in statistical calculation is obtained in a step of statistical calculation, it may be reflected in result of statistical calculation. If an occupancy ratio of pixels subjected to statistical calculation to the total number of pixels is obtained in the step of statistical calculation, it may be reflected in result of statistical calculation. Sill more, it is not necessarily required to perform subtraction to attain a difference between a predetermined optimum value and a result value in statistical calculation. It is just required to include any proper calculation inherently.

A degree of color adjustment may also be determined in a variety of forms.

Another object of the present invention is to provide a color adjustment device of determining a degree of color adjustment.

According to the present invention, there is provided a color adjustment device wherein, in the color adjustment degree judging unit, a tone curve representing input-output relationship information is used for changing a degree of element color enhancement, and a tone curve is formed according to the degree of color adjustment.

In the above-mentioned arrangement of the present invention, a tone curve is formed according a degree of color adjustment, and a degree of element color enhancement is changed according to the tone curve thus formed so that input-output relationship information on each element color is represented by the tone curve.

In accordance with the present invention, since a tone curve is used, it is easy to add adjusted conditions of other element colors from an overall point of view. In this case, a memory color part is adjusted toward an ideal color level and adjacent color regions are adjusted gradually in a continuous manner, thereby preventing occurrence of pseudo-contouring due to tone jumping.

The above and other objects, features and advantages of the present invention will become more apparent from the following description of embodiments with reference to the accompanying drawings.

BRIEF DESCRIPTION OF THE DRAWINGS

FIG. 9 shows a region reference table used for storing specified regions and image processing objects;

FIG. 16 shows a conversion table for expanding a luminance distribution range;

FIG. 21 is a diagram showing an unsharp mask comprising 5×5 pixels;

FIG. 29 is a diagram showing a window for selecting a color adjustment object for the color adjustment processing.

DETAILED DESCRIPTION OF THE PREFERRED EMBODIMENTS

The present invention will now be described in detail by way of example with reference to the accompanying drawings.

Figure 1:
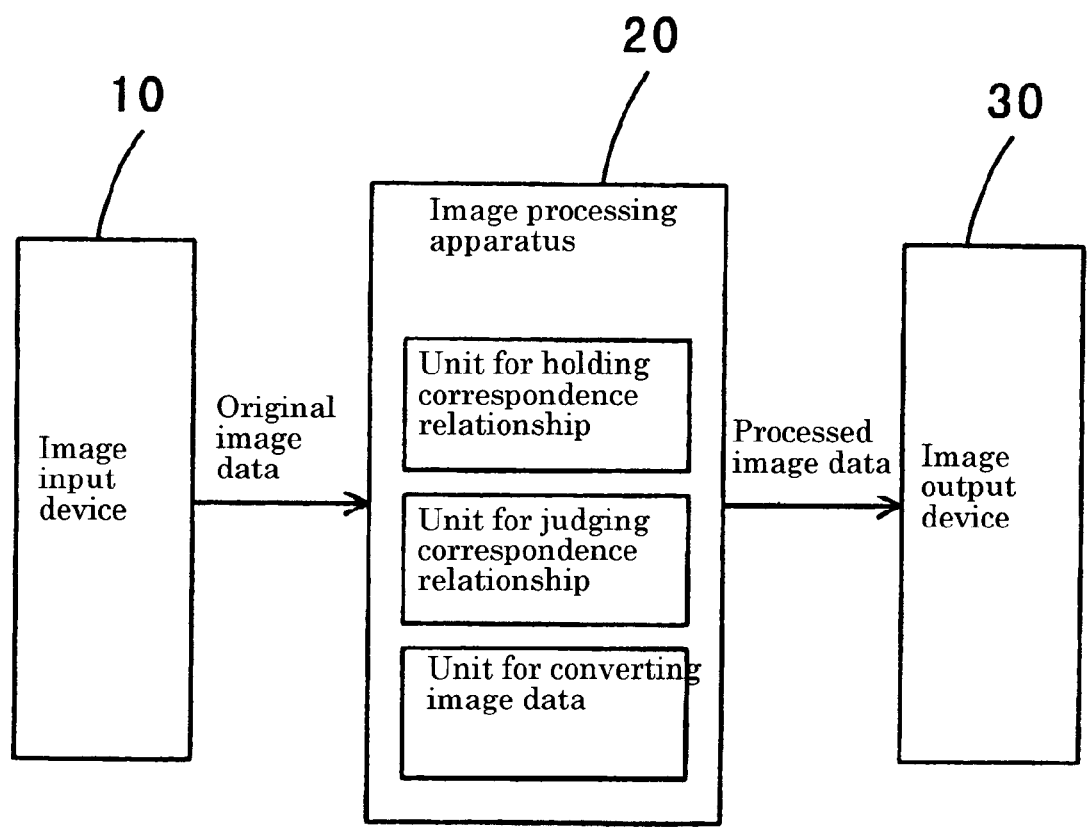
FIG. 1 is a block diagram showing an image processing apparatus in a preferred embodiment of the present invention.
Figure 2:
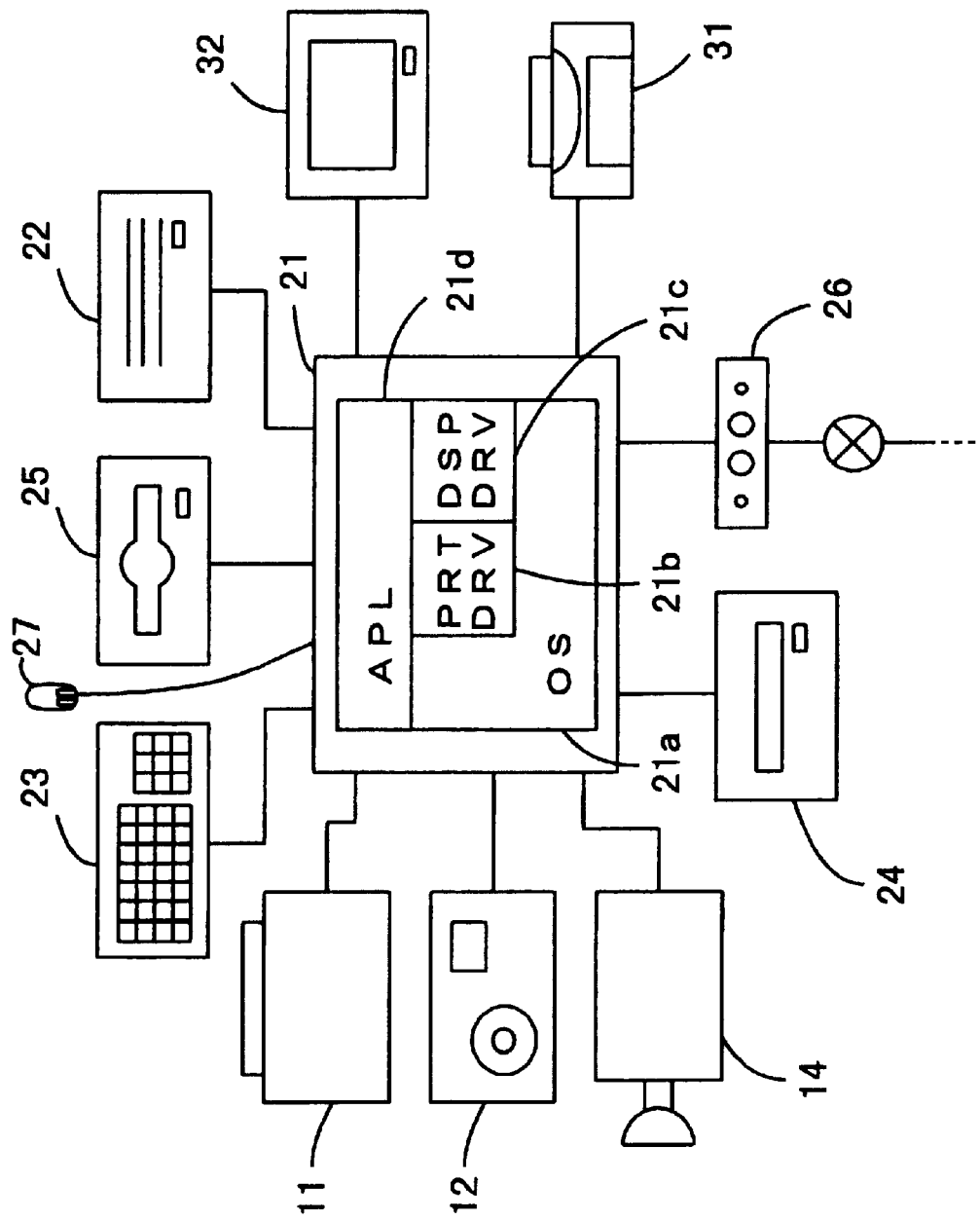
FIG. 2 is a block diagram showing concrete examples of hardware for the image processing apparatus according to the present invention.

FIG. 1 shows a block diagram of an image processing scheme using an image processing apparatus in a preferred embodiment of the present invention, and FIG. 2 presents a schematic block diagram illustrating a concrete example of a hardware configuration.

Referring to FIG. 1, an image input device 10 supplies photographic image data containing dot-matrix pixels of a photographic or picture image to an image processing apparatus 20, on which an object applicable to image processing and conditions thereof are specified and then image processing is carried out for object pixels. Thereafter, the image processing apparatus 20 delivers the image data thus processed to an image output device 30, on which the processed image is output in a dot-matrix pixel form.

As shown in FIG. 2, a concrete example of the image input device 10 is a scanner 11, a digital still camera 12 or a video camcorder 14, a concrete example of the image processing apparatus 20 is a computer system comprising a computer 21, a hard disk unit 22, a keyboard 23, a mouse 27, a CD-ROM drive unit 24, a floppy disk drive unit 25, a modem 26, etc., and a concrete example of the image output device 30 is a printer 31 or a display monitor 32. In the present preferred embodiment, photographic image data is most suitable as input data since objet pixels are specified for correcting deficiencies in an image and image processing is performed according to a predetermined correspondence relationship. The modem 26 can be connected to a public communication line for downloading software and data from an external network through the public communication line.

In the present preferred embodiment, the scanner 11 or digital still camera 12 serving as the image input device 10 provides RGB (red, green, blue) gradation image data, the printer 31 serving as the image output device 30 requires input of CMY (cyan, magenta, yellow) or CMYK (cyan, magenta, yellow, black) binary gradation data, and the display monitor 32 requires input of RGB gradation data. In the computer 21, a printer driver 21b for the printer 31 and a display driver 21c for the display monitor 32 are run under control of an operating system 21a.

Furthermore, an image processing application 21d is controlled by the operating system 21a for execution of processing thereof, and the image processing application 21d carries out predetermined image processing in conjunction with the printer driver 21b or the display driver 21c as required. Therefore, the computer 21 serving as the image processing apparatus 20 is used for receiving RGB gradation data and generating optimally image-processed RGB gradation data through image evaluation for output onto the display monitor 32 by means of the display driver 21c. The computer 21 is also used for converting RGB gradation data into CMY (or CMYK) binary data for output onto the printer 31 by means of the printer driver 21b.

Figure 3:
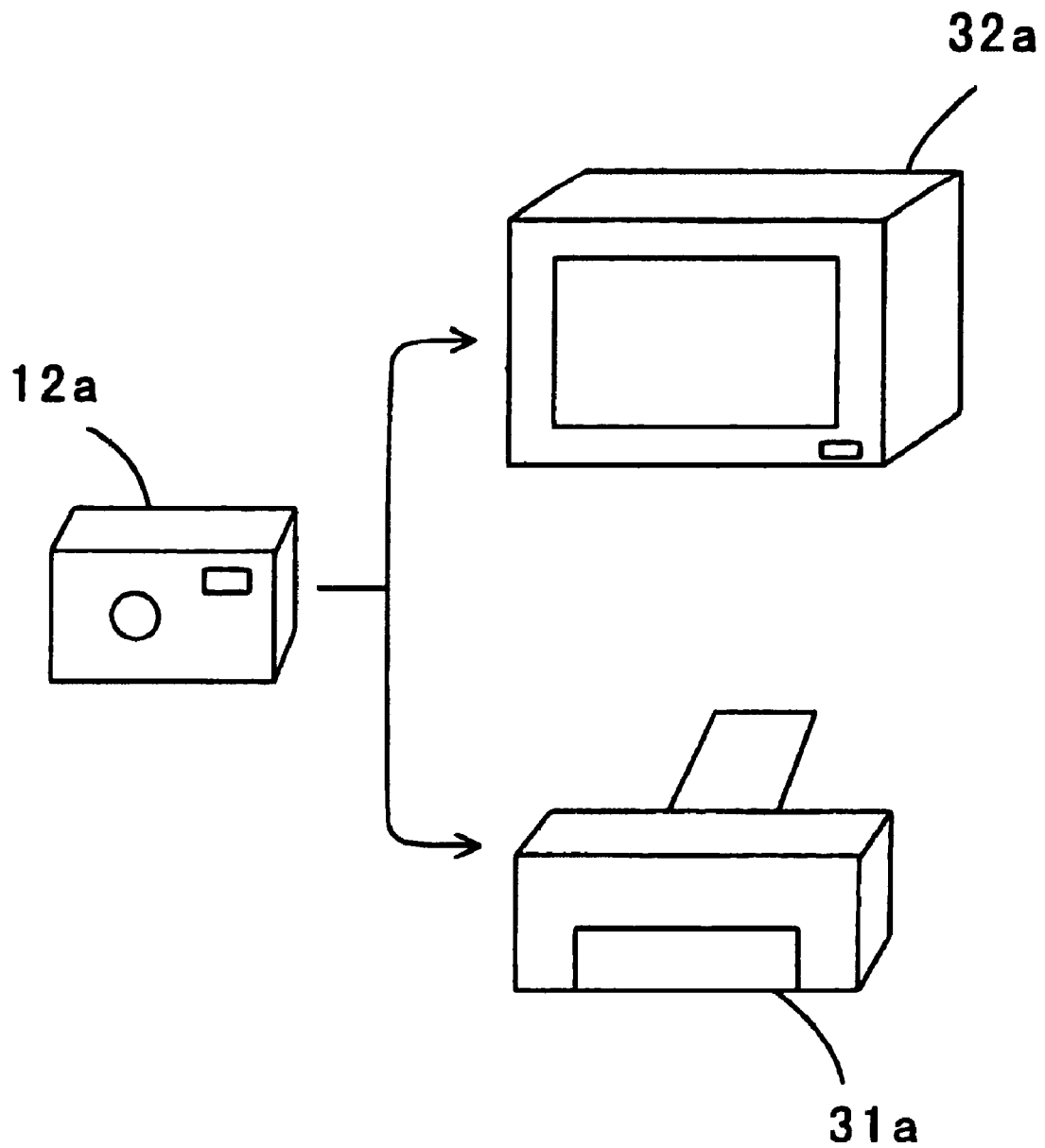
FIG. 3 is a schematic block diagram showing another example of application of the image processing apparatus according to the present invention.
Figure 4:
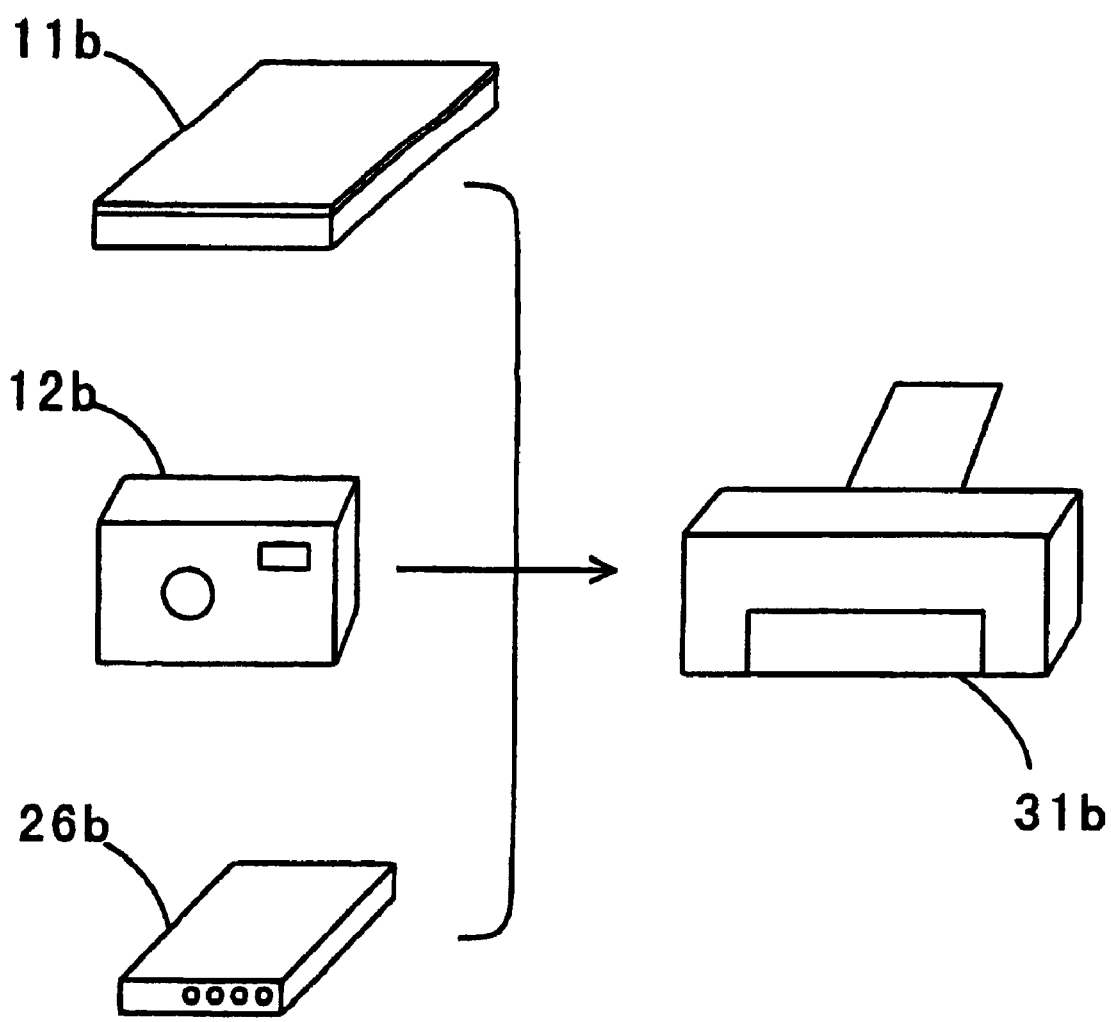
FIG. 4 is a schematic block diagram showing another example of application of the image processing apparatus according to the present invention.

As mentioned above, the computer system is arranged between the image input device and the image output device for carrying out image evaluation and image processing in the present preferred embodiment. The computer system is not always required, however. It is to be understood that the invention is applicable to a variety of image data processing apparatuses. As shown in FIG. 3, for example, there may be provided such a system arrangement that an image processing apparatus for carrying out image processing for each predetermined applicable object is incorporated in a digital still camera 12a and converted image data is displayed on a display monitor 32a or printed on a printer 31a. Still more, as shown in FIG. 4, for a printer 31b capable of receiving image data and printing images without using a computer system, there may be provided such an arrangement that image data is input from a scanner 11b, a digital still camera 12b or modem 26b to the printer 31b, in which image processing is carried out through judgment on whether or not each pixel belongs to each applicable object.

Figure 5:
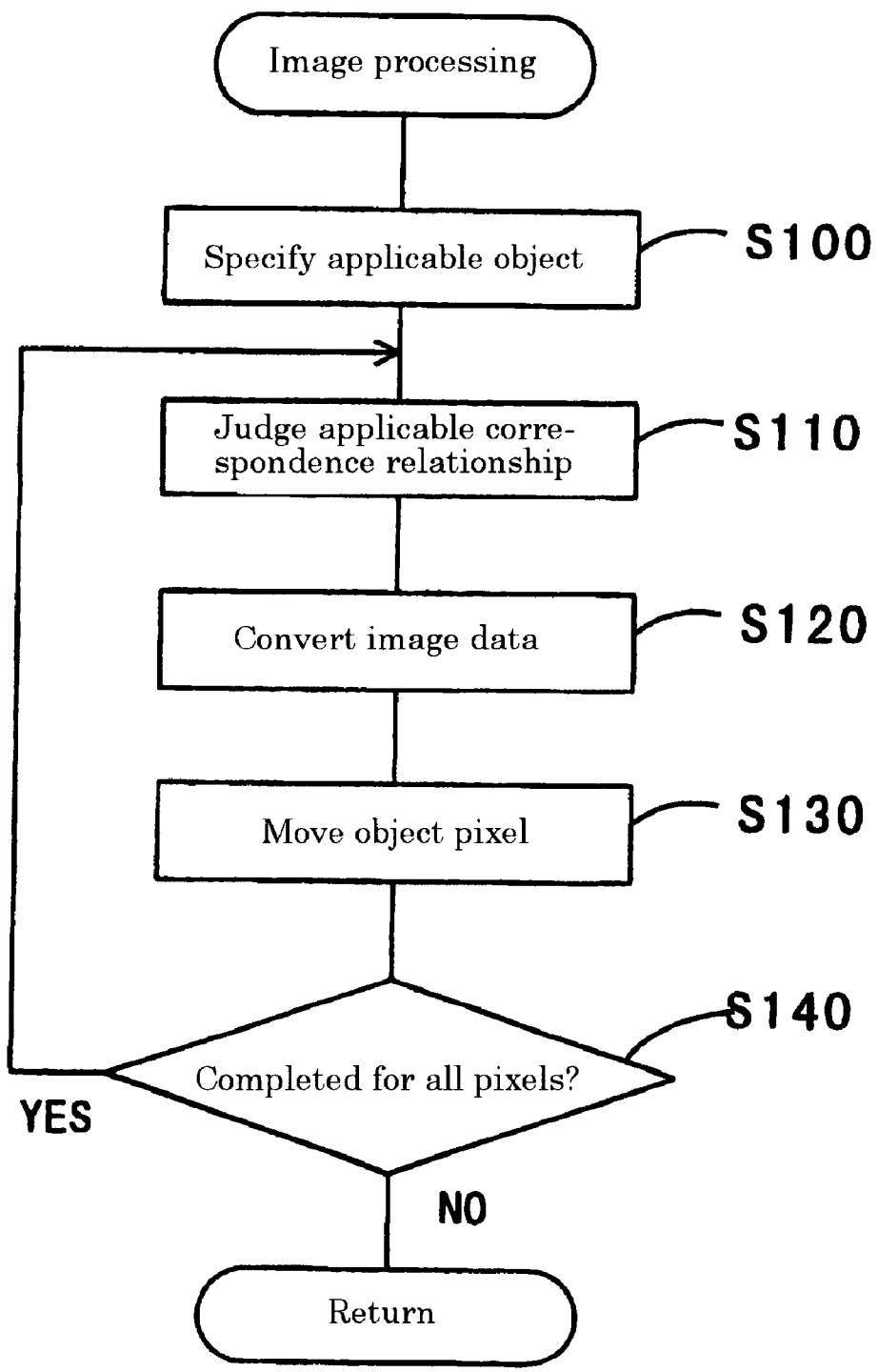
FIG. 5 is a flowchart of image processing in the image processing apparatus according to the present invention.
Figure 6:
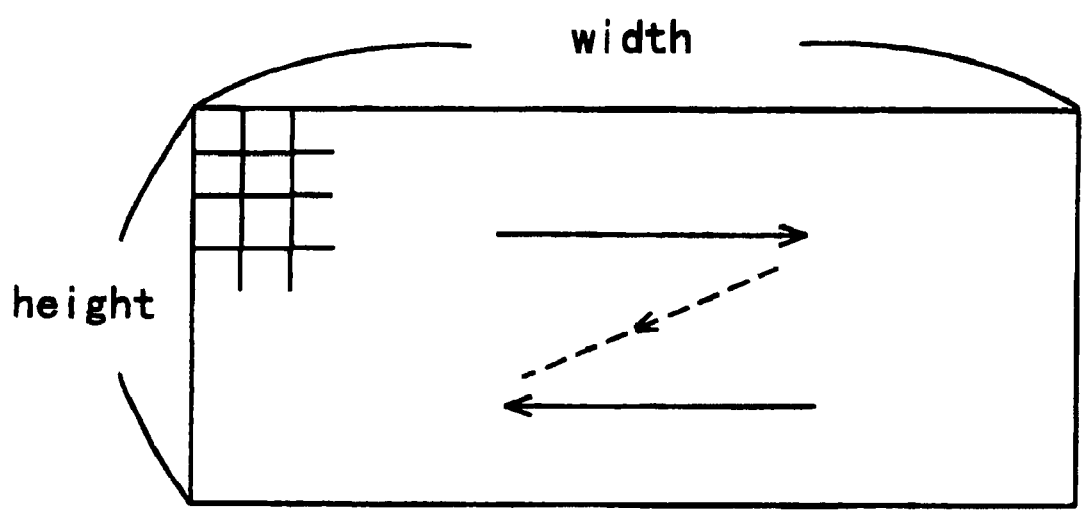
FIG. 6 is a diagram showing a state in which a processing object pixel is moved.

In the embodiments mentioned above, image evaluation and image processing are implemented by means of an image processing program flowcharted in FIG. 5, which is run on the computer 21, for example. Referring to FIG. 5, the image processing program is executed through the following steps: At the first step S100, an applicable object is specified for each image processing. At steps S110 to S140, a predetermined image processing operation is performed by moving an object pixel for each dot-matrix pixel as shown in FIG. 6. More specifically, at step S110, it is judged whether each object pixel is applicable to image processing conditions specified at S100. At step S120, image data is converted according to the result of judgment. In this conversion, image processing is accomplished in effect. At steps S130 and S140, each object pixel is moved as required. The following describes this image processing flow in further detail.

Figure 7:
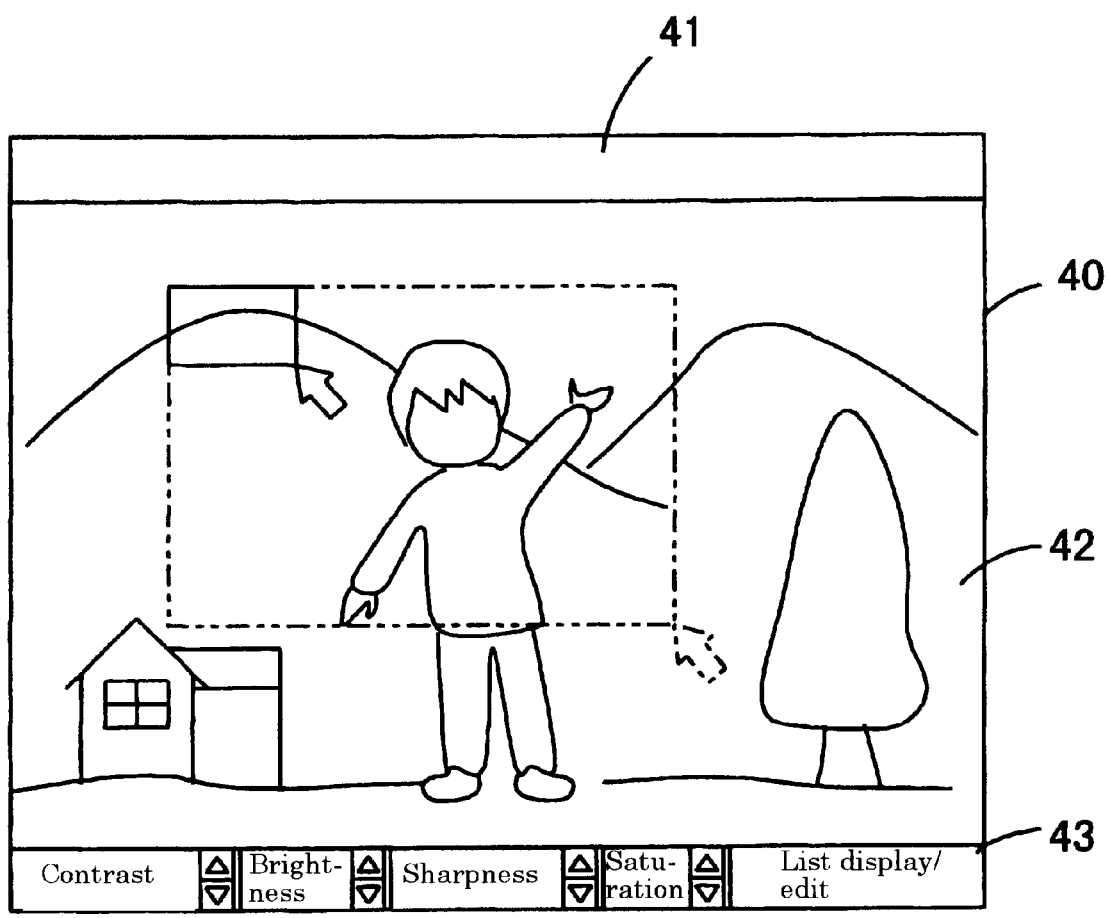
FIG. 7 is a diagram showing a display window for specifying a processing object area and a processing item.
Figure 8:
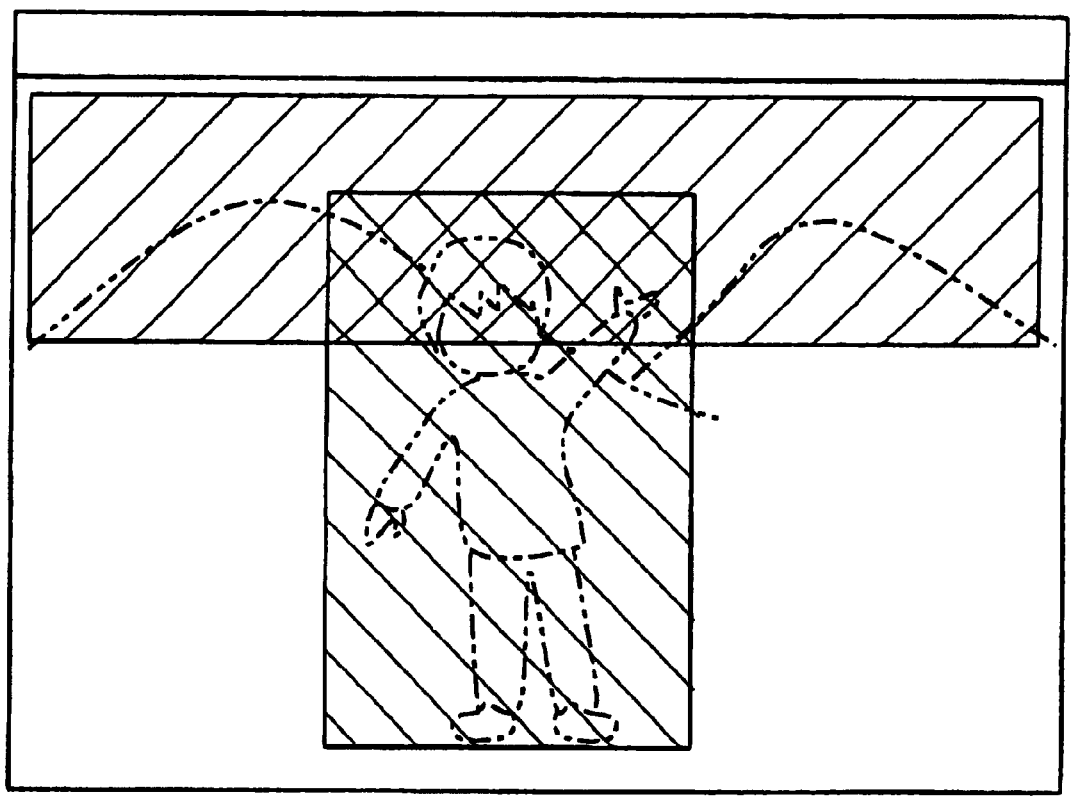
FIG. 8 is a diagram showing that two processing object areas are selected.

Depending on image processing conditions, it is determined which pixels are to be subjected to image processing. In the present preferred embodiment, a part of image to be processed is specified as shown in FIGS. 7 and 8. Referring to FIG. 7, there are provided an operation area 41 along a top side of a window 40 for window frame operation, a display area 42 at a center part of the window 40, and a processing menu area 43 at a bottom side of the window 40 for image processing menu items.

An image to be processed is displayed on the display area 42, a rectangular region is specified using the mouse 27, and an image processing menu item is selected on the processing menu area 43 using the mouse 27. The processing menu area 43 contains executable image processing items including 'CONTRAST' adjustment, 'BRIGHTNESS' adjustment, 'SHARPNESS' adjustment and 'SATURATION' adjustment items, each of which is provided with arrows for specifying a degree of adjustment. For instance, clicking an up-arrow of 'CONTRAST' adjustment item with the mouse 27 specifies image processing for increasing contrast, and clicking a down-arrow thereof specifies image processing for decreasing contrast.

For each specified region of image, a plurality of image processing items may be selected. When 'LIST DISPLAY/ EDIT' item on the processing menu area 43 is clicked, information on a selected image processing item is displayed as shown in a region reference table exemplified in FIG. 9, i.e., an upper left corner coordinate point and a lower right corner coordinate point of each specified region, a specified kind of image processing, and a specified level of adjustment are displayed. A level value indicates a degree of image processing adjustment, which can be increased/decreased by clicking an up/down-arrow of each image processing item on the processing menu area 43 as many times as required. A kind-of-processing code indicates a particular kind of image processing as follows: In the example shown in FIG. 9, the CONTRAST adjustment item is indicated as '1', the BRIGHTNESS adjustment item is indicated as '2', the SHARPNESS adjustment item is indicated as '3', and the SATURATION adjustment item is indicated as '4'. The kinds of image processing and levels of adjustment will be described in more detail together with description of image processing conditions. For removing a image processing item from the region reference table, it is just required to highlight the image processing item by clicking with the mouse and press a DELETE key on the keyboard 23. Besides, the contents of the region reference table can be edited in other manners similar to those in ordinary application software.

In the present preferred embodiment, since the image processing application 21d is executed at an application level of the operating system 21a, an image be processed can be displayed in the window 40 and a region of interest can be specified in it. However, in an instance where the same image processing functionality is implemented at a driver level of the operating system 21a, e.g., in the printer driver 21b, an image to be processed may not be displayed in a window.

Figure 10:
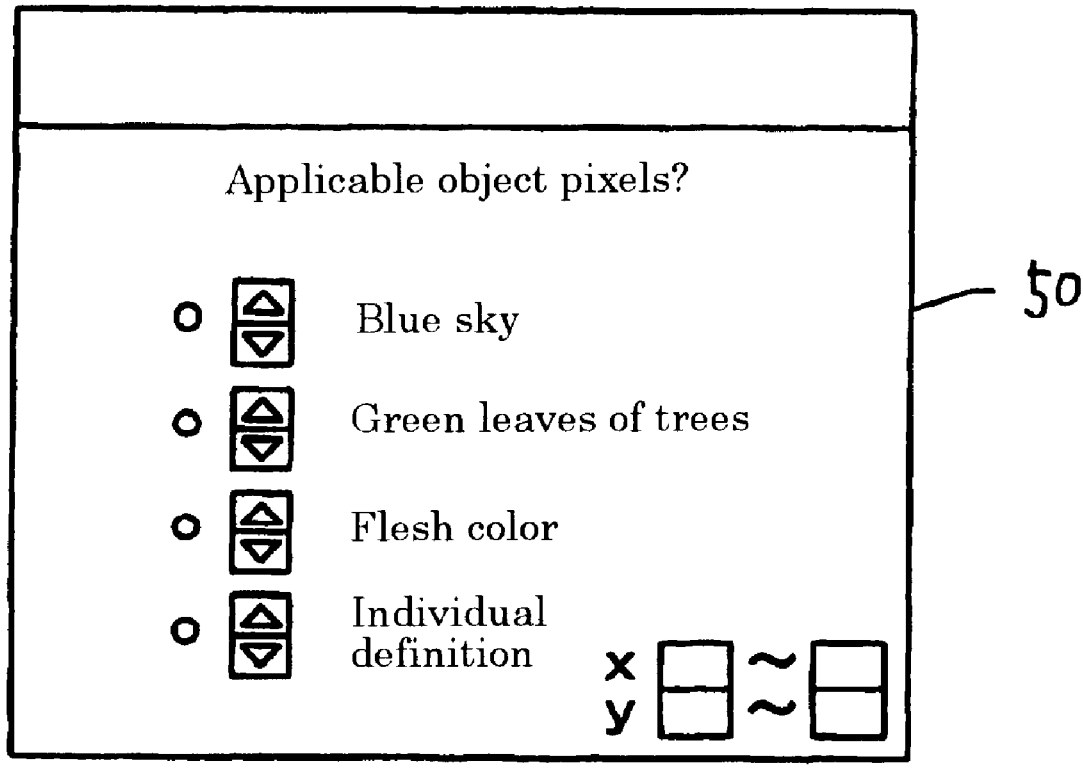
FIG. 10 is a diagram showing a window for selecting a processing object and a processing item.

FIG. 10 shows an example in which an object of image processing is specified regardless of whether windowing display is provided or not. When the printer driver 21b is made active, an window 50 is selectable as an option. While a part of image to be processed is specified in the examples shown in FIGS. 7 to 9, pixels to be processed are selected by specifying image chromaticity this example. The following describes chromaticity used in the invention.

As an example of representation in chromaticity, "x-y" chromaticity calculation is performed below. Assuming that RGB gradation data containing pixels to be processed in RGB color scheme is (R, G, B), the following expressions are given.

$$r = R/(R+G+B) \quad (1)$$

$$g = G/(R+G+B) \quad (2)$$

Then, in XYZ color scheme, the following correspondence relationship is set up between chromaticity coordinates "x" and "y".

$$x = (1.1302 + 1.6387r + 0.6215g)/(6.7846 - 3.0157r - 0.3857g) \quad (3)$$

$$y = (0.0601 + 0.9399r + 4.5306g)/(6.7846 - 3.0157r - 0.3857g) \quad (4)$$

Since a value of chromaticity represents an absolute ratio in psychophysical color specification which does not depend on brightness, it is possible to identify an object to which the pixels of interest belong according to chromaticity thereof.

For example, in an object image of a person, it is necessary to extract pixels in a flesh color part. A value of chromaticity of flesh color is in a range expressed below.

$$0.35 < x < 0.40 \quad (5)$$

$$0.33 < y < 0.36 \quad (6)$$

Figure 11:
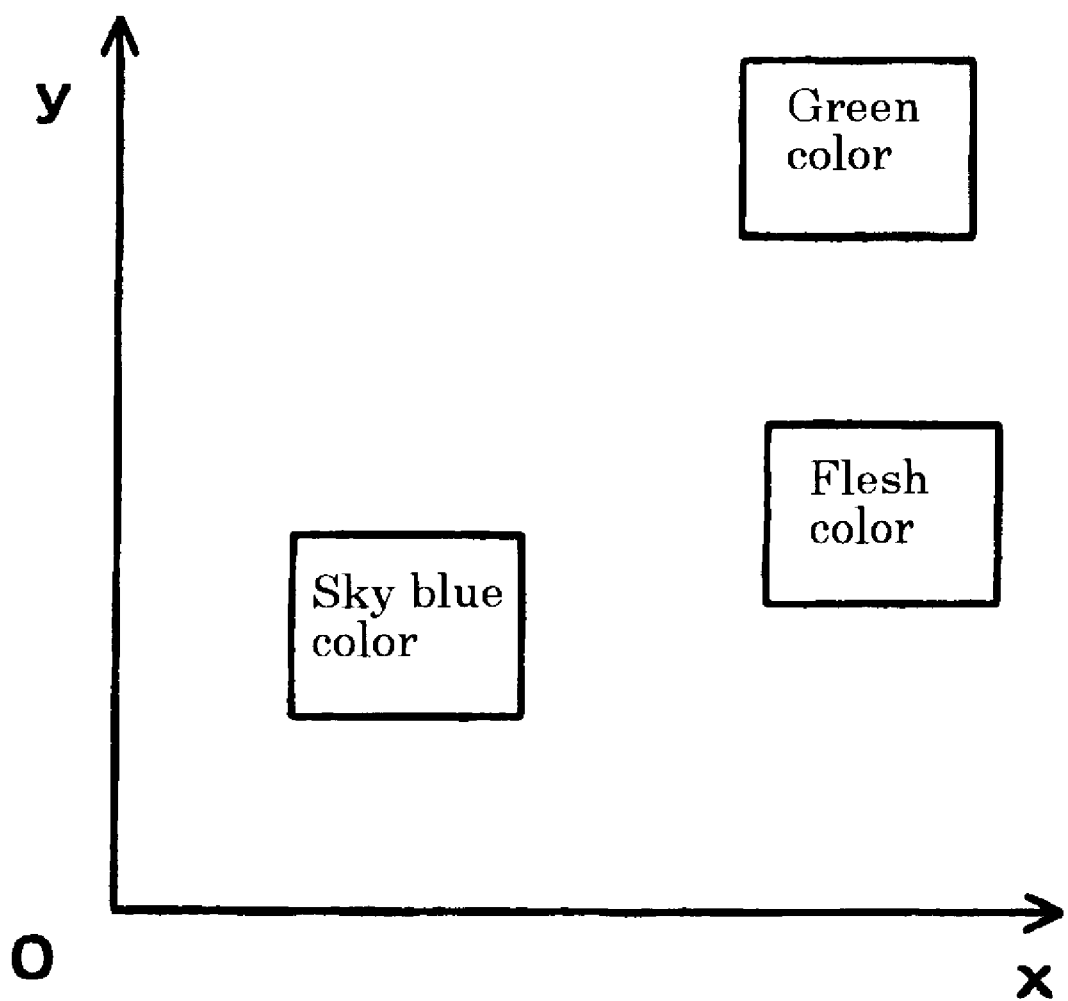
FIG. 11 is a diagram showing rectangular regions specified with chromaticity "x-y"

Hence, if a determined chromaticity value of each pixel is within the range indicated above, it can be assumed that the pixel of interest corresponds to a point of skin of a person's image in most cases. Similarly, as to such object images as blue sky and green leaves of trees, chromaticity is also applicable in judgment. Regardless of brightness, pixels of blue sky and green leaves of trees can be identified approximately. FIG. 11 shows a distribution relationship of "x-y" chromaticity, in which there are indicated applicable rectangular regions corresponding to flesh color, sky-blue color and green color of leaves. As shown in FIG. 10, there may be provided such an arrangement that a range value of "x-y" chromaticity distribution can be specified directly for individual definition.

Figure 12:
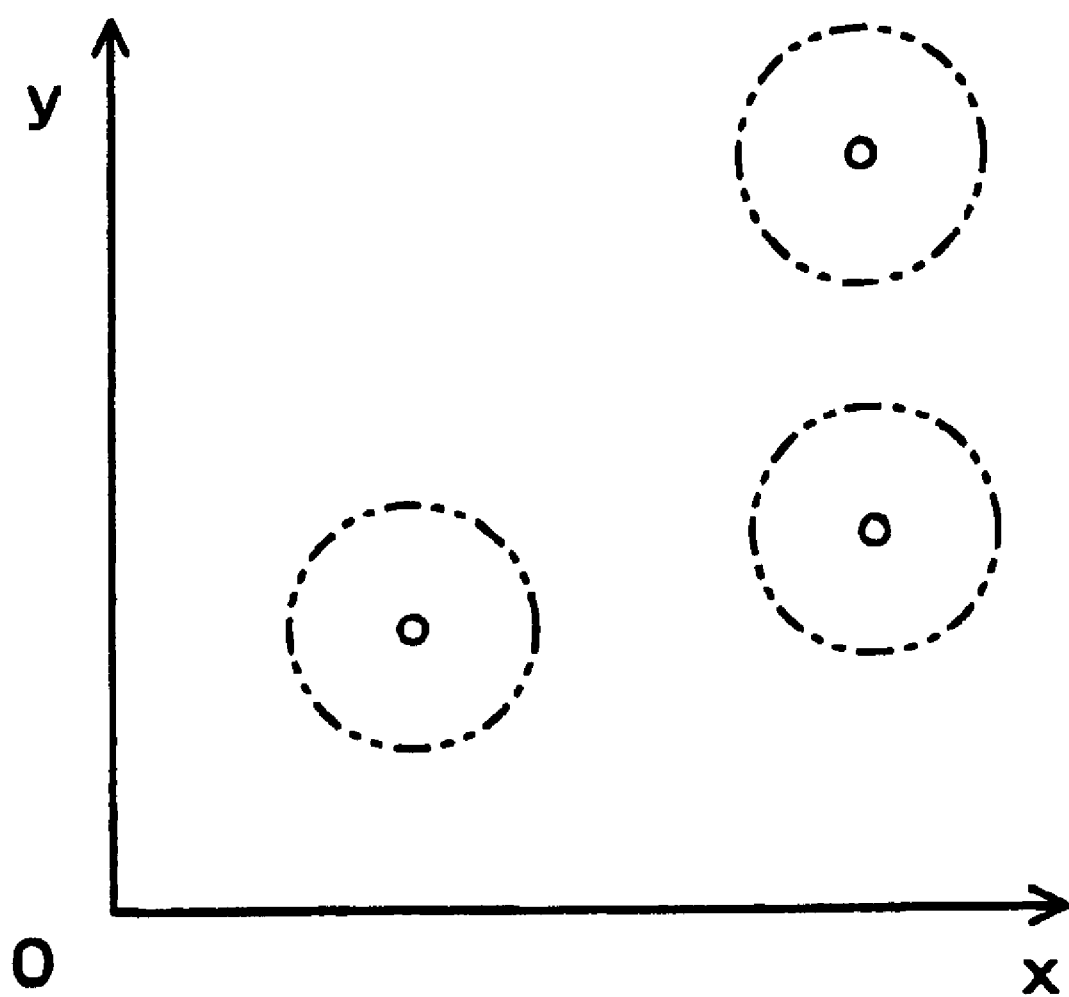
FIG. 12 is a diagram showing that center points are specified with chromaticity "x-y"

FIG. 12 shows a technique for specifying a center point in determination of each applicable region. In case of flesh color, a center point of its applicable region is found as expressed below using Equations (5) and (6).

$$x = 0.375 \quad (7)$$

$$y = 0.345 \quad (8)$$

Then, with reference to this center point, it is checked whether a value of chromaticity is within a range of a predetermined radius or not. If this condition is satisfied, it is judged that each pixel of interest belongs to a particular applicable region.

In the window 50 selectable using an optional function of the printer driver 21b, there are provided adjustment items which indicate practical examples corresponding to predefined chromaticity ranges to be specified for an object so that a human operator can easily adjust a color of blue sky or green leaves of trees as desired. In addition, there are provided arrow buttons which are used for increasing or decreasing chromaticity of pixels of interest.

In the example shown in FIG. 10, a range of pixels is specified with chromaticity and it is determined whether the chromaticity is to be enhanced or not in image processing. However, it is not always necessary to let chromaticity-based pixel selection be consistent with image processing to be performed. For instance, in image processing, it is allowed to increase brightness of flesh color pixels or contrast of green color pixels. Namely, chromaticity is used only as an index indicating whether pixels of interest are to be processed or not. In this example, chromaticity is used just for the purpose of pixel selection in image processing.

As described above, step S100 at which an applicable object is specified for each image processing comprises the unit for specifying a correspondence relationship. However, it is to be understood that step S100 is not limited to this function and may be modified to provide the unit for specifying a part of image or a value of chromaticity as required. There may also be provided such an arrangement that other factors including brightness and sharpness are specified. As shown in FIG. 9, the region reference table for indicating a specified region and holding its image processing in a correspondence relationship is stored in a memory area of the computer system in the present preferred embodiment. It will be obvious to those skilled in the art that the region reference table is used to provide the unit for holding a correspondence relationship in combination with a color conversion table for image processing (to be described later).

At step S110 and the subsequent steps, each object pixel is moved and it is judged whether each object pixel is applicable to a specified operation of image processing as mentioned above. For checking whether each object pixel is to be subjected to image processing or not, the region reference table shown in FIG. 9 is used. A coordinate location of each object pixel is compared with upper left corner and lower right corner coordinates indicated in each field of the region reference table. If the coordinate location of each object pixel meets a coordinate value indicated in any field, it is judged that the object pixel of interest is applicable to image processing. If it does not meet any coordinate value indicated in any field, it is judged that the object pixel of interest is not applicable to image processing. In case that chromaticity is used for judgment as shown in FIG. 10, object pixel chromaticity is calculated using Equations (1) to (4), and it is judged whether a calculated value is within a chromaticity range selected using an optional function of the printer driver 21b.

Whether an object is applicable to image processing or not is judged according to apart of image or chromaticity as mentioned above. However, if an alternative-choice judgment is made to determine whether a specific range is satisfied or not, any visual stepwise difference is prone to occur in an adjacent region. For instance, if brightness of a certain rectangular region is increased while brightness of an immediate outside part thereof is not increased, a stepwise difference in brightness occurs on a boundary therebetween, resulting in the rectangular region being distinguishable clearly.

Figure 13:
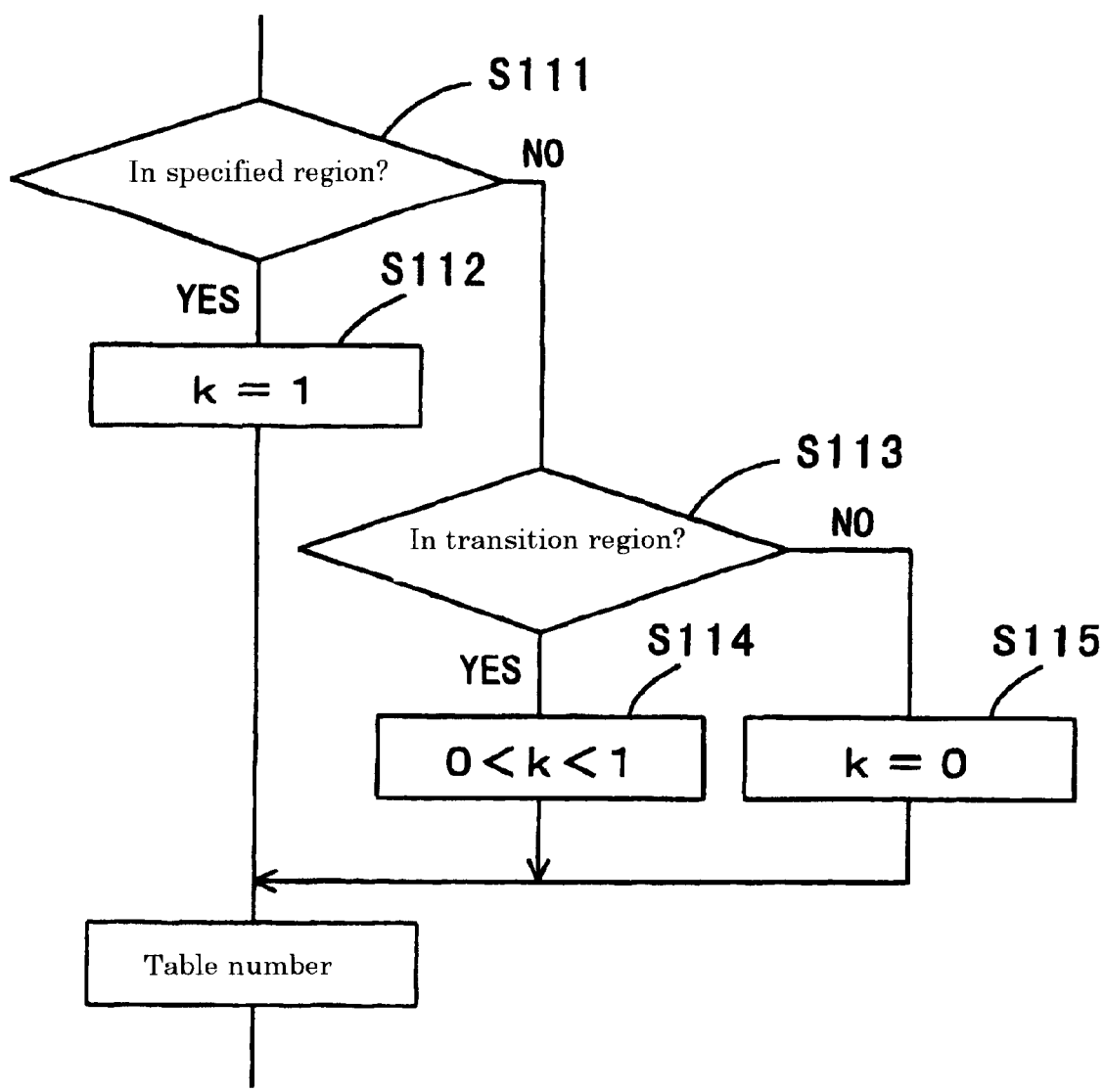
FIG. 13 is a flowchart of applicability setting.
Figure 14:
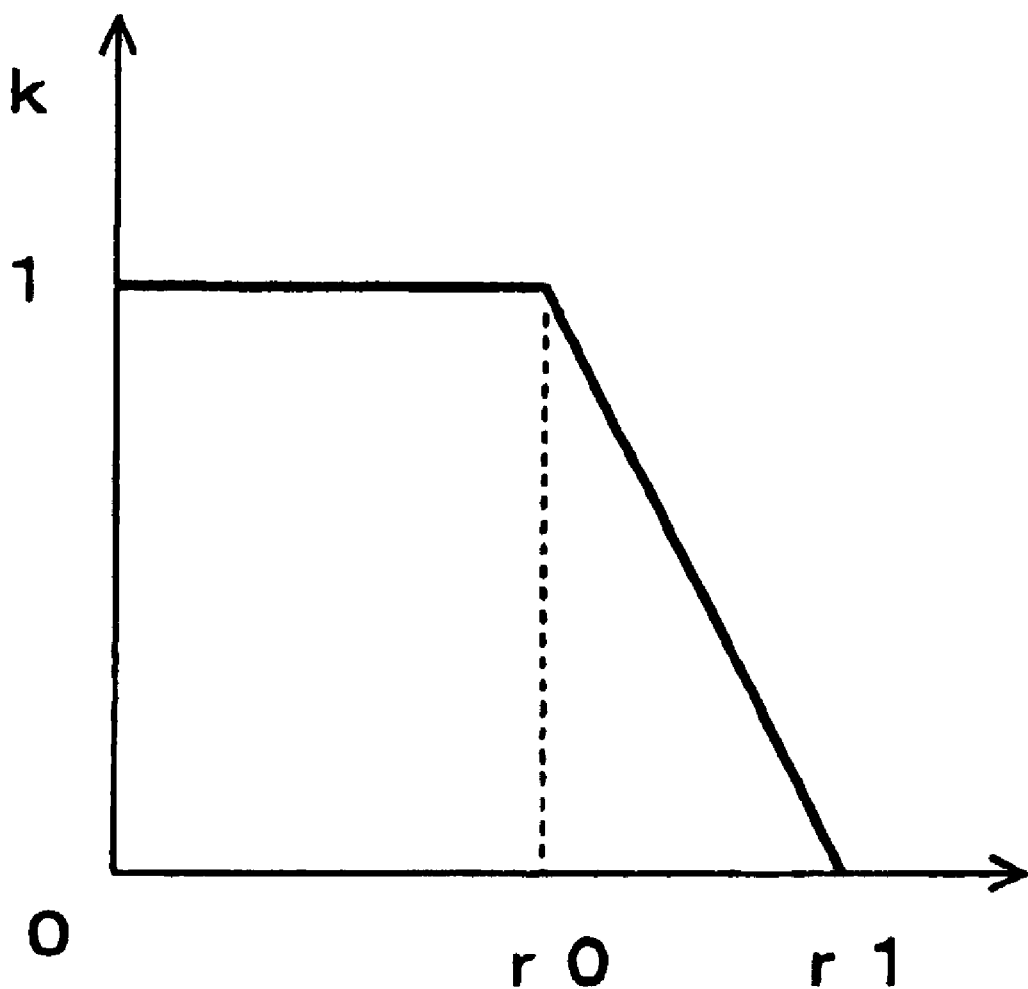
FIG. 14 is a graph showing a change in applicability when a center point is specified with chromaticity "x-y"

To circumvent this adverse effect, the present preferred embodiment uses a parameter of image processing applicability k. Referring to FIG. 13, if an object is judged to belong to a specified region at step S111, applicability k is set to '1' at step S112. For a transition region on a circumference of the specified region, applicability k is changed in a range of '0' to '1'. More specifically, if the object is judged to be within the transition region at step S113, applicability k is adjusted toward '1' at step S114 in case the object is near the specified region or it is adjusted toward '0' in case the object is apart from the specified region. If the object is judged not to belong to the specified region nor the transition region, applicability k is set to '0' at step S115. While a center point of chromaticity is specified as exemplified in FIG. 12, there may be provided such an arrangement as shown in FIG. 14. Referring to FIG. 14, applicability k is set to '1' for an image processing object corresponding to radius 'r0', and under condition that a transition region is provided in a range of radius 'r0' to 'r1', applicability k is gradually adjusted toward '0' in a circumferential region.

At step S110, an applicable correspondence relationship is judged, and at steps S111 to S115, applicability k is determined as mentioned above. According to the present preferred embodiment, there is provided the unit for judging a correspondence relationship using software processing including such procedural steps as steps S110 to S115 mentioned above and hardware for implementation thereof. While applicability k is determined as a result of judgment in each image processing in the present preferred embodiment, it will be obvious to those skilled in the art that an alternative-choice judgment is also feasible in application.

At step S120, image processing is carried out for each object pixel according to applicability k. The following describes more specific conditions of image processing in practicing the present invention.

Figure 15:
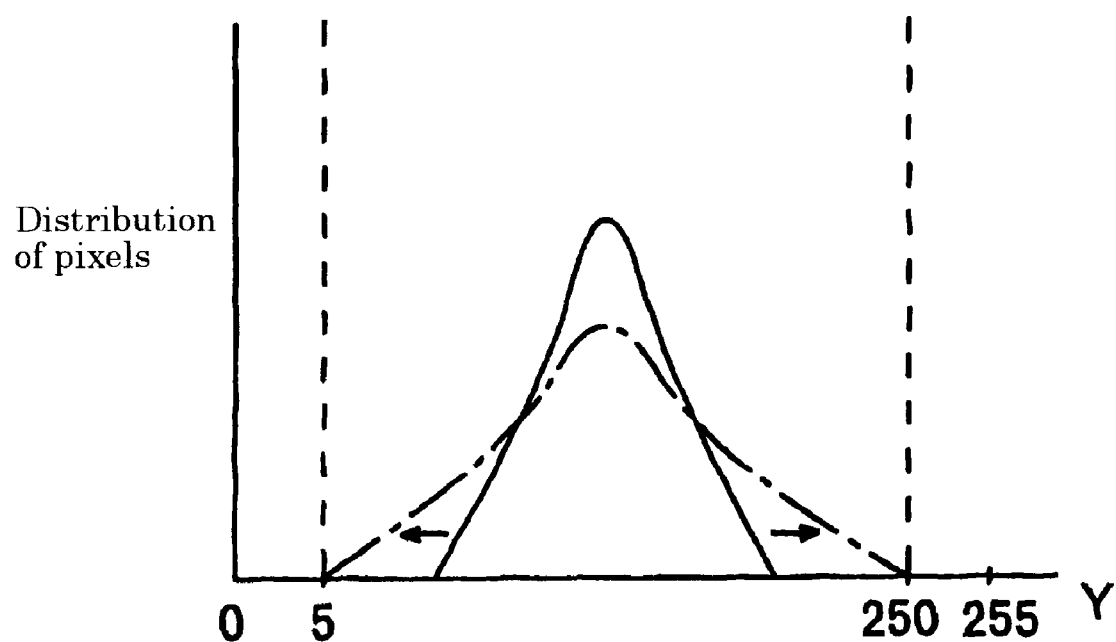
FIG. 15 is a graph showing a luminance distribution range in expansion.
Figure 17:
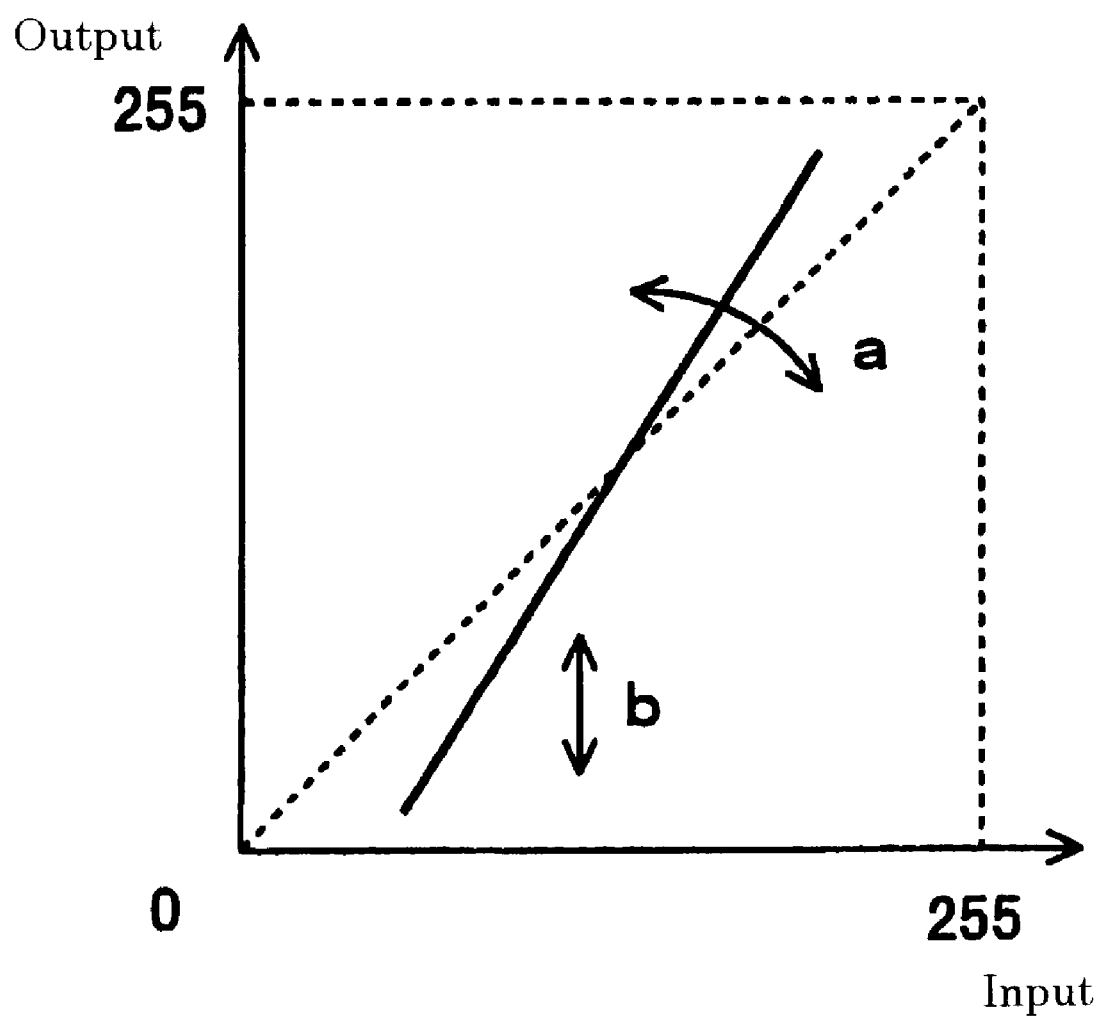
FIG. 17 is a graph showing a conversion relationship for expanding a luminance distribution range.

Contrast indicates a width of luminance in an entire image, and inmost cases of contrast adjustment, it is desired to increase a width of contrast. Referring to FIG. 15, there is shown a histogram of statistical luminance distribution of pixels of a certain image. In case of a solid-line curve of narrow distribution, a difference in luminance among bright and dark pixels is relatively small. In case of a dot-dashed-line curve of broad distribution, a difference in luminance among bright and dark pixels is relatively large, which signifies that a width of contrast is increased. Referring to FIG. 17, there is shown a graph indicating a luminance conversion operation for enhancing contrast. Assuming that the following equation holds for a relationship between original unconverted luminance y and converted luminance Y, $$Y=ay+b \quad (9)$$

Through conversion under condition "a>1", a difference between a maximum value of luminance 'y max' and a minimum value of luminance 'y min' is increased, resulting in a broad distribution of luminance as shown in FIG. 15. In this case, it is preferred to determine slope 'a' and offset 'b' according to luminance distribution. For example, the following equations are given:

$$a=255/(y\ max-y\ min) \quad (10)$$

$$b=-a \cdot y\ min\ or\ 255-a \cdot y\ max \quad (11)$$

Under the conditions indicated above, a certain narrow luminance distribution can be expanded to a reproducible extent. However, if it is expanded to an extreme end of a reproducible range, highlights may be blown out to white or shadows may be plugged up to black. To prevent this, a non-expandable margin corresponding to a luminance value of approx. '5' is provided at each of the upper and lower limits of the reproducible range. Resultantly, conversion parameters are expressed as follows:

$$a=245/(y\ max-y\ min) \quad (12)$$

$$b=5-a \cdot y\ min\ or\ 250-a \cdot y\ max \quad (13)$$

In this case, conversion is not performed in ranges where "y<5" and "y>250".

Figure 16:
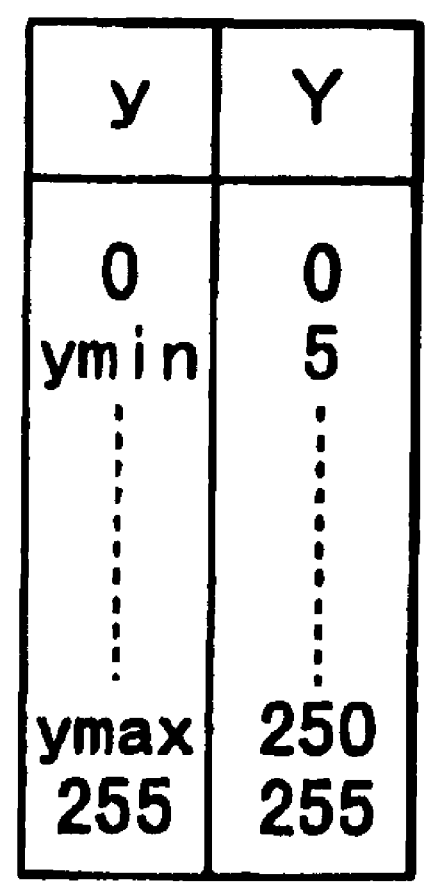

In image data conversion, it is not required to perform calculation each time. If a luminance value range is '0' to '255', a result of conversion is predetermined for each luminance value and a conversion table is prepared as shown in FIG. 16. In this case, the conversion table is usable just for luminance. In an instance where image data contains direct elements of luminance, the conversion table can be used. Contrarily, in an instance where image data contains only indirect elements of luminance, the conversion table cannot be used. In most computer systems, red, green and blue elements of image data are indicated in gradation of brightness, i.e., color gradation data (R, G, B) is used. Since such gradation data (R, G, B) does not provide direct values of luminance, it is necessary to perform conversion to Luv color space scheme for determining luminance. This method is, however, disadvantageous since a large amount of calculation is required. Therefore, the following conversion expression is used, which is commonly adopted in television signal processing for directly determining luminance from RGB data:

$$y=0.30R+0.59G+0.11B \quad (14)$$

On a principle that linear conversion can be made between gradation data and luminance y as indicated above, Equation (9) is applicable to a relationship between original unconverted gradation data (R0, G0, B0) and converted gradation data (R1, G1, B1). Then, the following expressions are given:

$$R1=aR0+b \quad (15)$$

$$G1=aG0+b \quad (16)$$

$$B1=aB0+b \quad (17)$$

Consequently, the conversion table shown in FIG. 16 is applicable to gradation data conversion.

Figure 18:
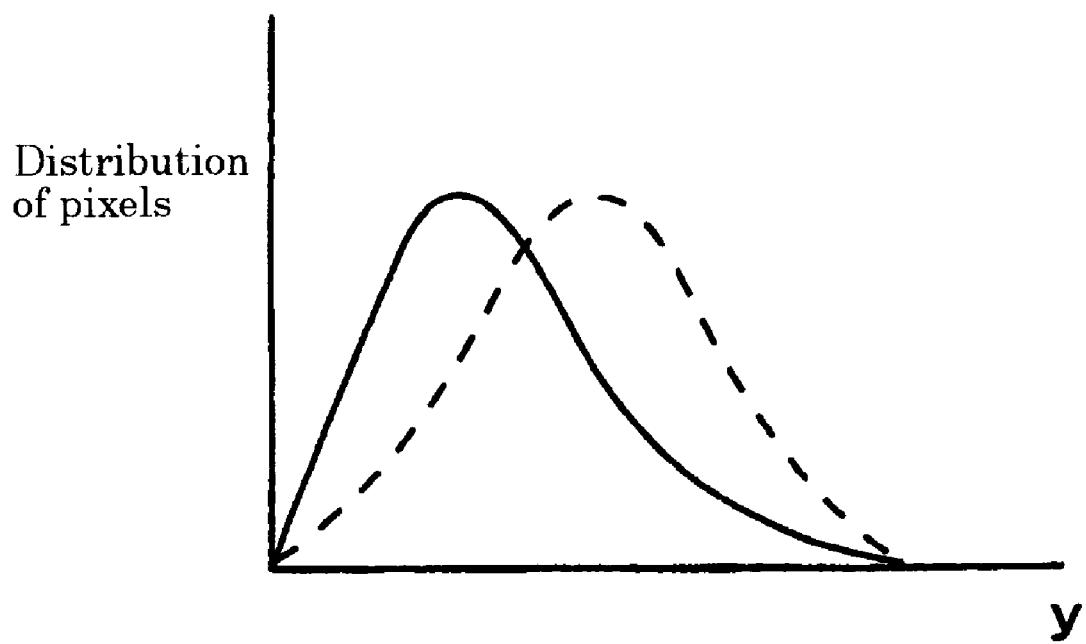
FIG. 18 is a graph showing a conceptual condition for increasing luminance by γ-curve correction.
Figure 19:
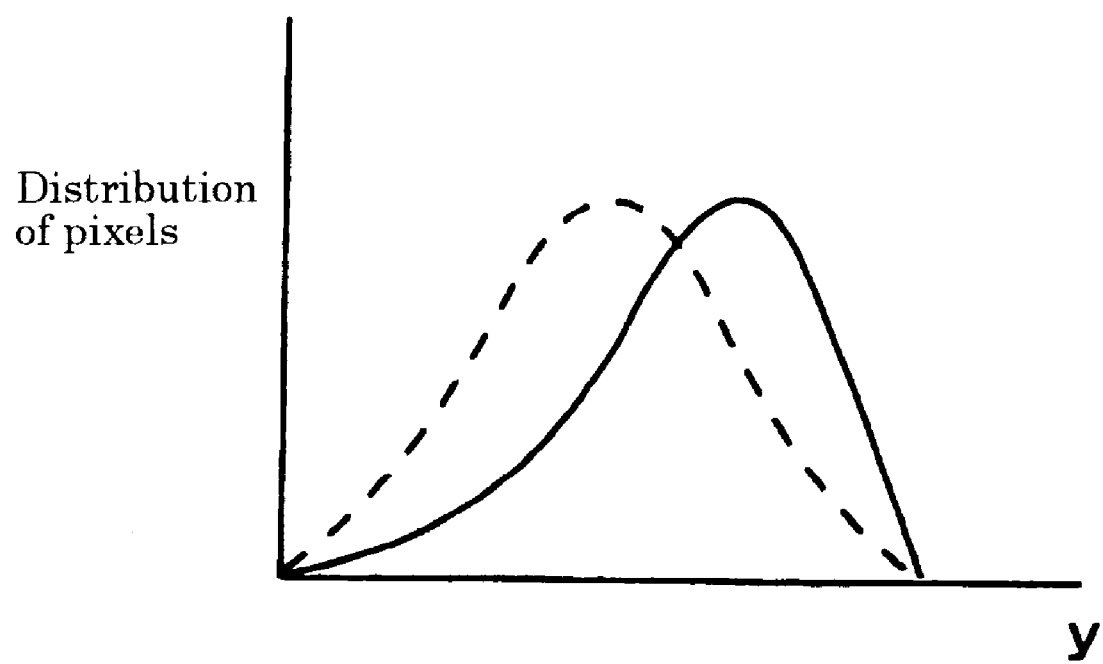
FIG. 19 is a graph showing a conceptual condition for decreasing luminance by γ-curve correction.
Figure 20:
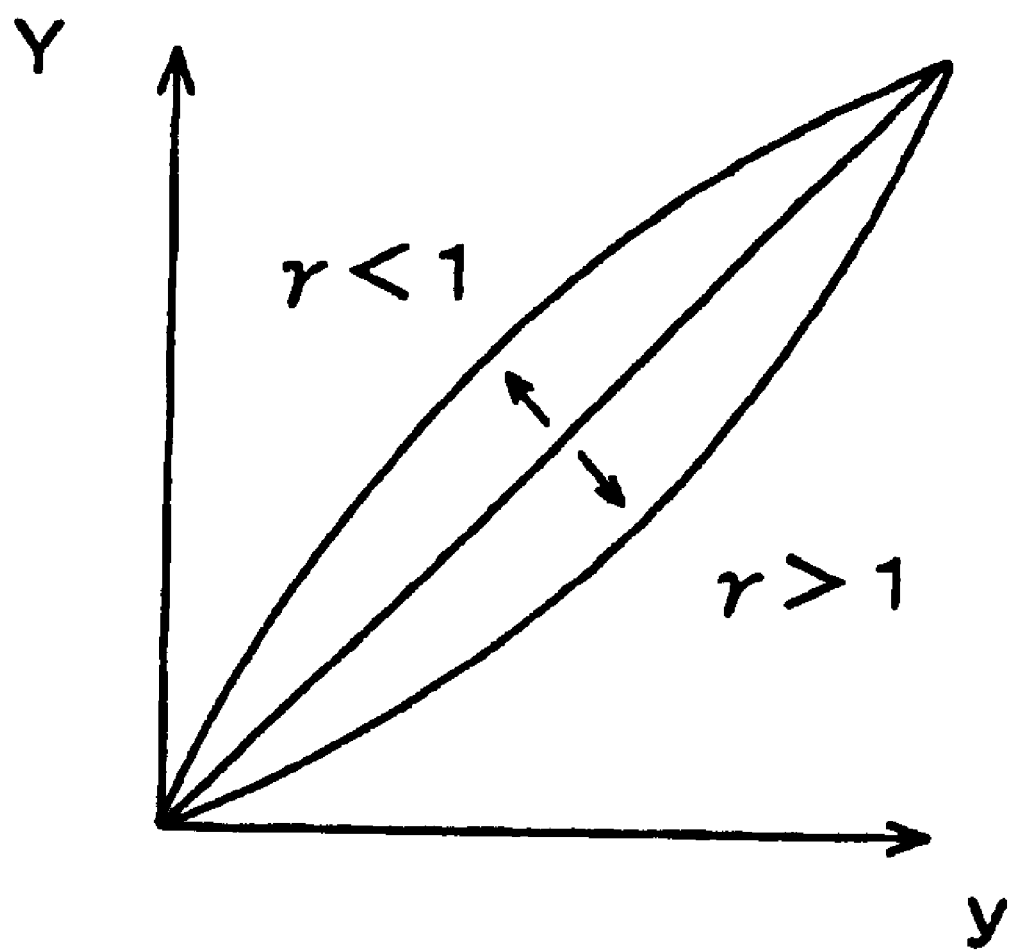
FIG. 20 is a graph showing a correspondence relationship of luminance subjected to γ-correction.

The following describes an image processing technique for adjusting brightness. As in the above-mentioned case of contrast adjustment, a histogram of brightness distribution is assumed. Referring to FIG. 18, a solid-line curve indicates a luminance distribution which has its peak inclined toward a dark level. In this case, the peak of entire distribution is shifted toward a bright side as indicated by a broken-line curve. Referring to FIG. 19, a solid-line curve indicates a luminance distribution which has its peak inclined toward a bright side. In this case, the peak of entire distribution is shifted toward a dark side as indicated by a broken-line curve. In these cases, linear luminance conversion as shown in FIG. 17 is not performed, but γ-curve luminance conversion is performed as shown in FIG. 20.

In γ-curve correction, entire brightness is increased when "γ<1", and it is decreased when "γ>1". A degree of this correction can be adjusted gradually by clicking an up-arrow or down-arrow of the BRIGHTNESS adjustment item on the processing menu area 43 shown in FIG. 7 as many time as required at step S100.

As in contrast adjustment, it is also possible to set up a value of γ automatically. As a result of our various experiments, it has been found that the following approach is advantageous: In a luminance distribution, median 'y med' is predetermined. If it is less than '85', an image of interest is judged to be too dark and γ correction is made according to a γ value indicated below.

$$\gamma = y\ \text{med}/85 \quad (18)$$

or, $$\gamma = (y\ \text{med}/85)**(1/2) \quad (19)$$

Note, however, that even if "γ<0.7", a value of γ is set to 0.7 forcedly. Unless this kind of limit is provided, a night-scene image appears to be of daytime. If an image is brightened excessively, it becomes whitish entirely, resulting in low contrast. In this case, it is preferred to perform such a processing operation as enhancement of saturation in combination.

If median 'y med' is larger than '128', an image of interest is judged to be too bright and γ correction is made according to a γ value indicated below.

$$\gamma = y\ \text{med}/128 \quad (20)$$

or, $$\gamma = (y\ \text{med}/128)**(1/2) \quad (21)$$

In this case, a limit is also provided so that a value of γ is set to 1.3 forcedly even if "γ>1.3" for the purpose of preventing the image of interest from becoming too dark.

For this γ correction, it is preferred to provide such a conversion table as shown in FIG. 16.

In edge enhancement processing for adjusting sharpness of an image, with respect to original non-enhanced luminance Y of each pixel, enhanced luminance Y' is calculated as expressed below.

$$Y' = Y + E\text{enhance} \cdot (Y - Y\text{unsharp}) \quad (22)$$

where 'Eenhance' indicates a degree of edge enhancement, and 'Yunsharp' indicates unsharp-mask processing for each pixel of image data. The following describes the unsharp-mask processing: Referring to FIG. 21, there is shown an example of an unsharp mask 60 comprising 5×5 pixels. The unsharp mask 60 is used in summation in such a manner that a center value of '100' is assigned as a weight to a processing object pixel 'Y(x,y)' in dot-matrix image data and a weight corresponding to a value in each array box of the unsharp mask 60 is assigned to each circumferential pixel thereof. In use of the unsharp mask 60, summation is performed based on the following expression:

$$Y\text{unsharp}(x, y) = (1/396) \sum_{ij} (Mij \times Y(x+i, Y+j)) \quad (23)$$

In Equation (23), '396' indicates a total value of weighting factors. For an unsharp mask having a different size, a total of values in array boxes thereof is indicated. 'Mij' represents a weighting factor indicated in each array box of an unsharp mask, and 'Y(x,y)' represents each pixel of image data. In the unsharp mask 60, 'i' and 'j' indicate coordinates on horizontal and vertical axes thereof.

Edge enhancement calculation based on Equation (22) provides the following functional meaning: 'Yunsharp(x,y)' is the result of addition in which a weight assigned to each circumferential pixel is reduced with respect to a pixel of interest, and accordingly an image is unsharpened through processing. Such an unsharpening operation is functionally equivalent to low-pass filtering. Therefore, "Y(x,y)−Yunsharp(x,y)" signifies that a low-frequency component is subtracted from each of original components, i.e., it is functionally equivalent to high-pass filtering. If a high-frequency component subjected to high-pass filtering is multiplied by a degree of edge enhancement 'Eenhance' and a result value of this multiplication is added to "Y(x,y)", it means that a high-frequency component is increased in proportion to the degree of edge enhancement 'Eenhance'. Thus, edge enhancement is accomplished. Since edge enhancement is required only for an edge part of an image, it is possible to reduce the amount of processing substantially by performing only in case that there is a large difference between adjacent pixels of image data.

In this case, the degree of edge enhancement 'Eenhance' can be adjusted by clicking an up-arrow or down-arrow of the SHARPNESS adjustment item on the processing menu area 43 shown in FIG. 7 as many times as required at step S100. Still more, it is possible to set up the degree of edge enhancement 'Eenhance' automatically.

At an edge part of an image, a difference in gradation data increases between adjacent pixels. This difference represents a gradient of luminance, which is referred to as a degree of edging. In an image, a degree of variation in luminance can be calculated by determining each of horizontal-direction and vertical-direction vector components. Although an object pixel in an image containing dot-matrix pixels is adjacent to eight pixels, a degree of variation is determined only with respect to adjacent pixels in horizontal and vertical directions for the purpose of simplifying calculation. Summation is performed on length values of respective vectors to represent a degree of edging 'g' for the object pixel of interest, and a sum value of edging degree is divided by the number of pixels to attain an average value. Assuming that the number of pixels is indicated as 'E(I)pix', a degree of sharpness 'SL' of an object image can be calculated as expressed below.

$$SL = \Sigma |g|/E(I)\text{pix} \quad (24)$$

In this case, as a value of 'SL' decreases, the degree of sharpness becomes lower (blurring). As a value of 'SL' increases, the degree of sharpness becomes higher (clearer imaging).

Since sharpness of an image depends on a visual sensation of an individual person, a degree of sharpness 'SL' is determined similarly using image data which has optimum sharpness attained experimentally. A value thus determined is set as an ideal level of sharpness 'SLopt', and a degree of edge enhancement 'Eenhance' is determined as expressed below.

$$E\text{enhance} = ks \cdot (SL\text{opt} - SL)**(1/2) \quad (25)$$

where coefficient 'ks' varies with a size of image.

In case that image data contains 'height' dots and 'width' dots in vertical and horizontal directions respectively, coefficient 'ks' can be determined as indicated below.

$$ks = \min(\text{height, width})/A \quad (26)$$

where 'min (height, width)' indicates the number of 'height' dots or the number of 'width' dots, whichever is smaller, and 'A' is a constant value of '768'. It is to be understood that the above value has been attained from experimental results and may be altered as required. Basically, as an image size increases, it is advisable to increase the degree of edge enhancement.

In the above-mentioned fashion, edge enhancement processing can be carried out in manual or automatic setting.

The following describes an image processing technique for adjusting saturation. In case of saturation adjustment using a saturation enhancement parameter 'Sratio', the parameter can be changed as required for such image data that has saturation parameters. For attaining a saturation value from gradation data containing RGB component values only, it is primarily necessary to perform conversion to a color space scheme in which saturation values are used as direct component values. However, in this processing, RGB image data is converted into Luv-space image data, and then after saturation enhancement, it is re-converted into RGB image data again, resulting in an increase in the amount of calculation. Therefore, RGB gradation data is directly subjected to saturation enhancement.

In RGB color space scheme in which components are represented by hue component values having approximately equivalent relationships, condition "R=G=B" signifies gray without saturation. It is therefore considered that a minimum value of each component indicates just a decrease in saturation without affecting hue of each pixel. Based on this principle, saturation can be enhanced by subtracting a minimum value of each component from all the component values and increasing a resultant difference value of subtraction.

If a component value of blue (B) is minimum in RGB gradation data containing red, green and blue components (R, G, B) conversion is performed as shown below using the saturation enhancement parameter 'Sratio'.

$$R' = B + (R-B) \times Sratio \qquad (27)$$

$$G' = B + (G-B) \times Sratio \qquad (28)$$

$$B' = B \qquad (29)$$

Thus, since there is no need to perform conversion and re-conversion between RGB color space scheme and Lub space scheme, a time required for processing can be reduced substantially. While the present preferred embodiment uses a technique of subtracting a minimum component value from another component value as to a non-saturated component, a different conversion equation may be used for subtracting a value of a non-saturated component. In case that just a minimum value is subtracted as in Equations (27) to (29), the amount of processing is relatively small since multiplication or division is not involved.

In saturation adjustment using Equations (27) to (29), satisfactory conversion can be performed but there is a tendency that an image becomes brighter entirely due to an increase in luminance when saturation is enhanced. Therefore, conversion is performed for a difference value attained by subtracting a value corresponding to luminance from each component value. Assuming that saturation enhancement is expressed as shown below, $$R' = R + \Delta R \qquad (30)$$

$$G' = G + \Delta G \qquad (31)$$

$$B' = B + \Delta B \qquad (32)$$

Each of the above operands $\Delta R$, $\Delta G$ and $\Delta B$ can be determined according to a difference value with respect to luminance as shown below.

$$\Delta R = (R-Y) \times Sratio \qquad (33)$$

$$\Delta G = (G-Y) \times Sratio \qquad (34)$$

$$\Delta B = (B-Y) \times Sratio \qquad (35)$$

Hence, conversion can be carried out as expressed below.

$$R' = R + (R-Y) \times Sratio \qquad (36)$$

$$G' = G + (G-Y) \times Sratio \qquad (37)$$

$$B' = B + (B-Y) \times Sratio \qquad (38)$$

As to retention of luminance, the following equations are applicable:

$$Y' = Y + \Delta Y \qquad (39)$$

$$\Delta Y = 0.30\Delta R + 0.59\Delta G + 1.11\Delta B \qquad (40)$$
$$= Sratio\{(0.30R + 0.59G + 0.11B) - Y\} = 0$$

In case of input of gray (R=G=B), condition "luminance Y=R=G=B" is set up, resulting in condition "operand $\Delta R = \Delta G = \Delta B = 0$". Thus, no color is given in case of non-saturation. In use of Equations (36) to (38), luminance can be retained and an image does not become brighter entirely even when saturation is enhanced.

In this case, the saturation enhancement parameter 'Sratio' can be adjusted by clicking an up-arrow or down-arrow of the SATURATION adjustment item on the processing menu area 43 shown in FIG. 7 as many times as required at step 100. Still more, it is possible to set up the saturation enhancement parameter "Sratio' automatically.

A value of pixel saturation can be determined in a simplified manner. For this purpose, a substitute value 'X' of saturation is calculated as shown below.

$$X = |G+B-2\times R| \qquad (41)$$

Essentially, a value of saturation becomes '0' under condition "R=G=B", and it becomes maximum when a single color of red, green and blue is given or two colors thereof are mixed at a predetermined ratio. Based on this nature, it is possible to represent a value of saturation directly. Yet, using the simple Equation (41), a maximum value of saturation is provided for a single color of red or a mixture color of cyan produced by mixing green and blue, and a value of saturation is indicated as '0' when each component is uniform. For a single color of green or blue, approximately half a level of maximum is provided. It is obvious that substitution into the following equations is also possible.

$$X' = |R+B-2\times G| \qquad (42)$$

$$X'' = |G+R-2\times B| \qquad (43)$$

Figure 22:
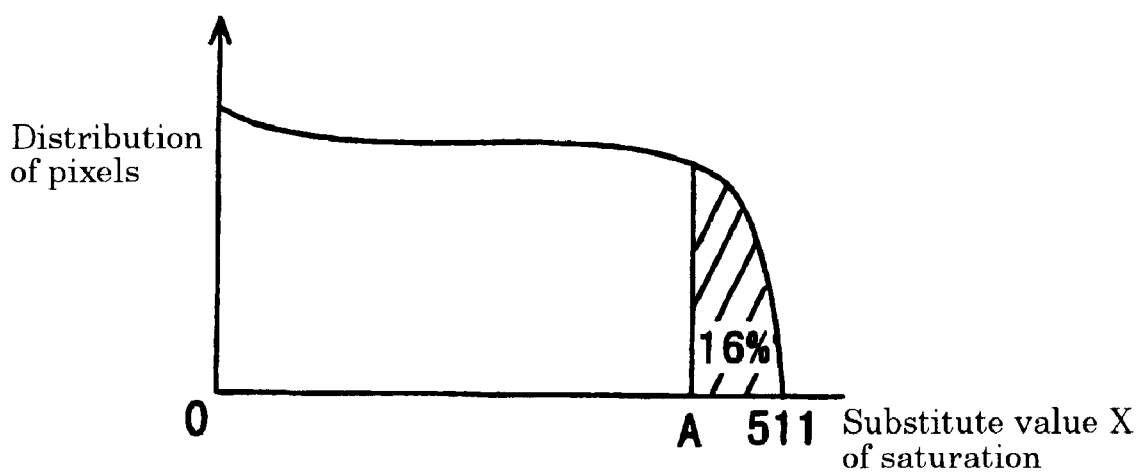
FIG. 22 is a graph showing a statistical condition of saturation distribution.

In a histogram distribution as to the substitute value 'X' of saturation, saturation levels are distributed in a range of minimum '0' to maximum '511' as schemed in FIG. 22. Then, according to the statistical saturation distribution shown in FIG. 22, a saturation index 'S' of an image of interest is determined. In the saturation distribution, a range of upper '16%' is defined, and a minimum saturation value 'A' in the defined range is taken to represent saturation of the image of interest.

If A<92, then $$S = -A \times (10/92) + 50 \qquad (44)$$

If $92 \leq A < 184$, then $$S = -A \times (10/46) + 60 \qquad (45)$$

If $184 \leq A < 230$, then $$S = -A \times (10/23) + 100 \qquad (46)$$

If $230 \leq A$, then $$S=0 \tag{47}$$

Figure 23:
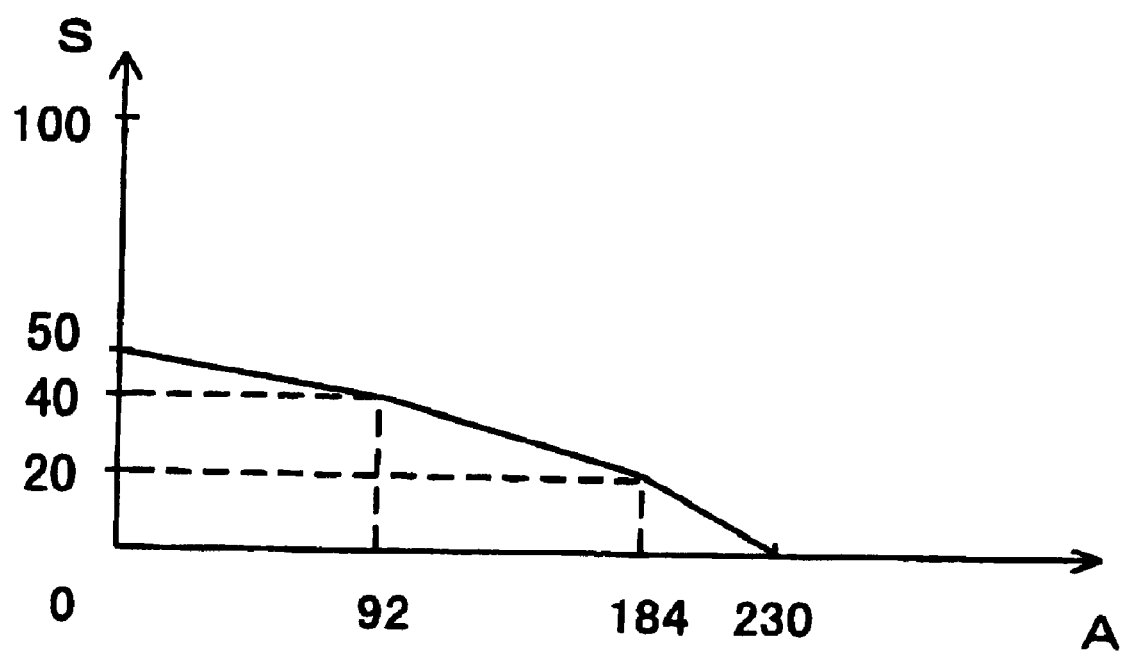
FIG. 23 is a graph showing a relationship between minimum saturation 'A' and saturation index 'S'.

In this manner, the saturation index 'S' is determined. Referring to FIG. 23, there is shown a relationship between minimum saturation 'A' and saturation index 'S'. As shown in this figure, the saturation index 'S' increases in a range of maximum '50' to minimum '0' as the saturation 'A' decreases, and it decreases as the saturation 'A' increases. For conversion from the saturation index 'S' to the saturation enhancement parameter 'Sratio', the following equation is applicable:

$$Sratio=(S+100)/100 \tag{48}$$

In this case, when the saturation index 'S' is '0', the saturation enhancement parameter 'Sratio' becomes '1' not to allow saturation enhancement.

The following describes a technique for enhancing chromaticity while specifying a range of pixels according to chromaticity as shown in FIG. 10. In principle, an approach for increasing luminance of pixels in chromaticity enhancement is employed. Therefore, a γ-correction tone curve as shown in FIG. 20 is used. According to a degree of chromaticity enhancement, a value of γ can be adjusted, and it is also possible to set up a γ value automatically, which will be described later.

In the present preferred embodiment, there are provided such image processing techniques as mentioned hereinabove. Since a correspondence relationship applicable to an object pixel is judged at step S110 and applicability k is determined at steps S111 to S115, image data conversion is performed at step S120 according to result of judgment.

As mentioned above, on the processing menu area 43 shown in FIG. 7, a kind of image processing is selected and a level of enhancement is specified. Therefore, at step S100, an image processing conversion table based on respective enhance levels for image processing is prepared and stored into a predetermined memory area of the computer system. Then, at step S120, the image processing conversion table is referenced to carry out conversion as described below.

Under condition that components of pre-converted RGB gradation data are (Rpre, Gpre, Bpre), components of post-converted RGB gradation data attained through reference to a predetermined conversion table are (Rpost, Gpost, Bpost), and components of final image data are (Rfinl, Gfinl, Bfinl), conversion is performed as expressed below.

$$Rfinl=k \cdot Rpost+(1-k) \cdot Rpre \tag{49}$$

$$Gfinl=k \cdot Gpost+(1-k) \cdot Gpre \tag{50}$$

$$Bfinl=k \cdot Bpost+(1-k) \cdot Bpre \tag{51}$$

In image processing based on these equations, a gradual increase in weight assignment is made in a transition region where applicability k varies from '0' to '1', resulting in elimination of a stepwise difference.

Equations (49) to (51) are used in succession for all the image processing conversion tables to which the object pixel is applicable. If applicability k is '0', it is not necessary to perform image data conversion. As to Equations (49) to (51), each of red, green and blue components is subjected to calculation, but just one or two of these components may be calculated in some cases. Still more, in such a situation where applicability k is not used, each component (Rpost, Gpost, Bpost) of RGB gradation data attainable just by changing a kind of conversion table may be used intactly.

In the foregoing description, an applicable object is specified for each image processing, i.e., only a particular region in view of an entire image is subjected to image processing. It is however possible to perform additional image processing operation on a particular region while carrying out a certain image processing operation in the entire image.

Under condition that each component (Rtotal, Gtotal, Btotal) can be attained as a result of image processing conversion for the entire image and each component (Rpart, Gpart, Bpart) can be attained as a result of image processing conversion for any particular region, weighted addition is performed using applicability k' similar to the applicability as shown below.

$$Rfinl=k' \cdot Rpart+(1-k') \cdot Rtotal \tag{52}$$

$$Gfinl=k' \cdot Gpart+(1-k') \cdot Gtotal \tag{53}$$

$$Bfinl=k' \cdot Bpart+(1-k') \cdot Btotal \tag{54}$$

Figure 24:
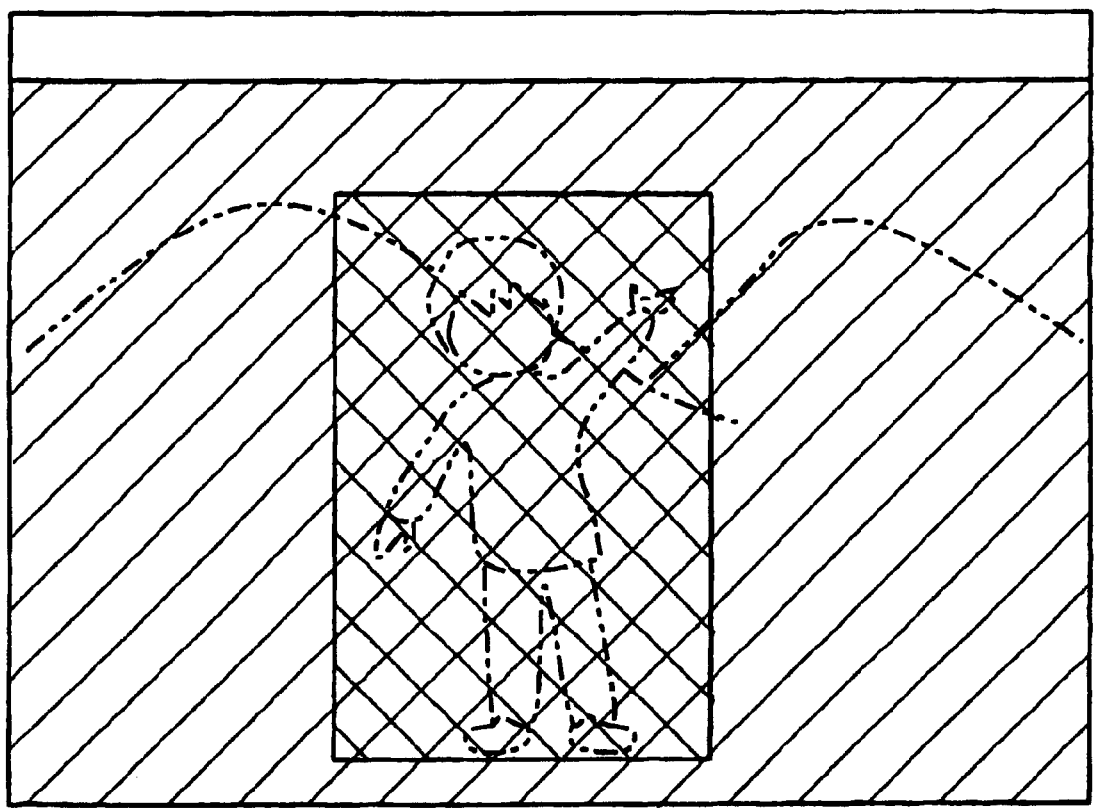
FIG. 24 is a diagram showing a display window which contains an area to be processed in entire image processing and an area to be processed in partial image processing.

Referring to FIG. 24, there is shown a schematic example in which an image of a slightly back-lighted person in a scene is selected to increase its brightness while entire color vividness is enhanced. A result of conversion on a region of the entire image (Rtotal, Gtotal, Btotal), hatched by frontward-sloping diagonal lines, is laid over a result of conversion on a region of the person's image (Rpart, Gpart, Bpart), hatched by backward-sloping diagonal lines, according to applicability k'. In this case, on the region of the person's image, applicability k' is set to a maximum level of 0.5, and on a transition region at a circumference thereof, applicability k' is adjusted in a range of 0<k'<0.5. Still more, if applicability k' is set to a maximum level of 1.0 on the region of the person's image and applicability k' is adjusted in a range of 0<k'<1.0 on the transition region at the circumference thereof, conversion for the entire image can be excluded from the region of the person's image. In the same manner, a multiplicity of image processing results can be applied.

Thereafter, at step S130, the object pixel is moved, and at step S140, it is checked whether all the object pixels have been subjected to processing. If processing is completed for all the object pixels, the image processing sequence concerned comes to an end.

Having described the present preferred embodiment as related to techniques for automatically setting up a degree of enhancement in respective image processing operations, there may also be provided such an arrangement that image data is sampled uniformly for statistical calculation at a step before movement of an object pixel as mentioned above and a degree of enhancement is set up automatically according to result of statistical calculation while a conversion table is created.

In an instance where a range of chromaticity is selected using an optional function of the printer driver 21b, an enhancement level can be set up automatically in such a manner as mentioned above, thereby making it possible to improve operability.

The following describes operations in the preferred embodiment arranged as stated above.

It is assumed that a photographic image is read in using the scanner 11 and printed out using the printer 31. First, under condition that the operating system 21a is run on the computer 21, the image processing application 21d is launched to let the scanner 11 read in the photographic image. When the photographic image thus read in is taken into the image processing application 21d under control of the operating system 21a, the image processing application 21d carries out image processing operations as flowcharted in FIG. 5.

At step S100, the read-in photographic image is presented on the display area 42 of the window 40 as shown in FIG. 7 so that an applicable object can be specified. In this state, a human operator specifies a rectangular region of sky-blue part using the mouse 27 and clicks the up-arrow of the SATURATION adjustment item on the processing menu area 43 as many times as desired for saturation enhancement. Still more, the operator specifies a rectangular region of person's image part at the center and clicks the up-arrow of the BRIGHTNESS adjustment item on the processing menu area 43 as many times as desired for brightness enhancement. Namely, while specifying an image processing operation of saturation enhancement on a rectangular region corresponding to a sky part of background, the operator specifies an image processing operation of brightness enhancement on a rectangular region corresponding to a person's image part.

When the window 40 is closed on completion of specifications, a conversion table is created according to the specifications. That is, a kind of image processing is determined with reference to a kind-of-processing code indicated on the region reference table shown in FIG. 9, and a degree of enhancement is judged according to a level-of-adjustment value indicated thereon for conversion table creation. In this example, a conversion table for saturation enhancement processing and a conversion table for brightness enhancement processing are created.

Thereafter, an object pixel applicable to processing is set at an initial position, and at step S110, it is judged whether or not a coordinate location of the object pixel is included in the region reference table shown in FIG. 9. In this case, a transition region is also taken into account, and applicability k is attained. If the object pixel is located in a hatched region as shown in FIG. 8, applicability k is set to '1'. Then, at step S120, with reference to a conversion table for applicable image processing, the image data is converted according to Equations (49) to (51). In an example shown in FIG. 8, the rectangular region specifying the background part and the rectangular region specifying the person's image part are overlaid partially, and an overlaid part is subjected to image data conversion through two steps using Equations (49) to (51). In a transition region, image data conversion is also performed to eliminate a stepwise difference along a non-specified circumferential part.

The above-mentioned operations are repeated while moving each object pixel applicable to processing at step S130 until it is judge at step S140 that all the pixels have been processed. Thus, saturation is enhanced on the sky-blue part to provide a clear blue sky image, while the person's part is brightened to provide such a blight image as photographed with flash light even if the person's image is back-lighted in scene. It is to be understood that the blue-sky part is not brightened due to enhancement of brightness of the person's part and saturation of the person's part is not increased due to enhancement of saturation of the blue-sky part.

Thereafter, image data thus processed is displayed on the display monitor 32 through the display driver 21c, and if the image thus displayed is satisfactory, it is printed out on the printer 31 through the printer driver 21b. More specifically, the printer driver 21b receives RGB gradation image data which has been subjected to image processing as specified for each specified region, performs resolution conversion as predetermined, and carries out rasterization according to a print head region of the printer 31. Then, the image data thus rasterized is subjected to RGB-to-CMYK color conversion, and thereafter, CMYK gradation image data is converted into binary image data for output onto the printer 31.

In an instance where the printer driver 21b is made active by a request for print processing from a certain application unlike the above-mentioned image processing through the image processing application 21d, an image to be read in may not be displayed on the display area 42 of the window 40. In this case, the printer driver 21b can present such an option selection window as shown in FIG. 10. On this window, the operator specifies a desired image processing item to attain a clear flesh color part of a person's image or a vivid green part of tree leaves, for example, while observing an original photograph or the like. This processing operation corresponds to step S100 in FIG. 5 at which an applicable object is specified.

After an optional processing item is selected, the printer driver 21b creates a conversion table internally and judges chromaticity of each pixel of input image data. Thus, it is checked whether chromaticity of each pixel is applicable to the selected optional processing item. If it is applicable, image processing conversion is carried out using Equations (49) to (51) with reference to the conversion table, and image data thus converted is further converted into CMYK image data which can be printed out onto the printer 31.

In such a manner as mentioned above, flesh color pixels of a person's image and green color pixels of tree images in an original scene are enhanced through adjustment, resulting in vivid imaging on printout.

Thus, on the computer 21 serving as the nucleus of image processing, a region applicable to image processing is specified at step S100, an object pixel is moved for judging whether or not it belongs to the specified region at steps S110 to S140, and then a specified image processing operation is carried out if the object pixel is judged to belong to the specified region. Therefore, adjustment of image data in a certain region does not have an adverse effect on image data in another region, making it possible to realize satisfactory adjustment in an entire image with ease.

While chromaticity enhancement is made in a range of pixels specified according to chromaticity in the example mentioned above, it is also practicable to set up a degree of enhancement automatically. The following describes details of a color adjustment device implemented for the purpose of automatic setting of a degree of enhancement.

Figure 25:
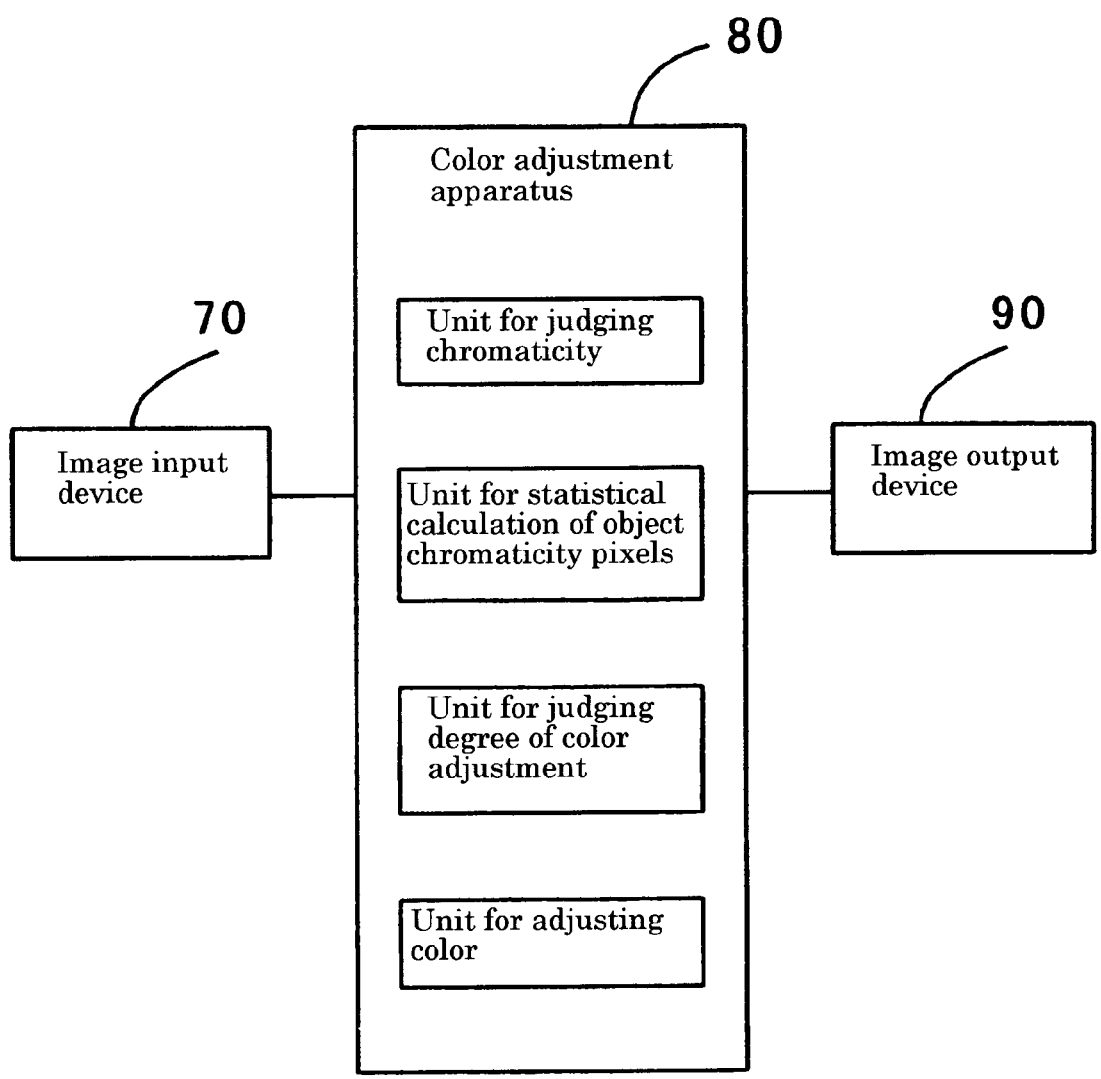
FIG. 25 is a block diagram showing a color adjustment device in a preferred embodiment of the present invention.

Referring to FIG. 25, there is shown a block diagram of a color adjustment device in a preferred embodiment of the present invention. A concrete example of a hardware configuration of this system is similar to that illustrated in FIG. 2.

In FIG. 25, an image input device 70 supplies photographic color image data containing dot-matrix pixels to a color adjustment device 80, on which optimum color adjustment processing for the color image data is carried out. Then, the color adjustment device 80 delivers color-adjusted image data to an image output device 90, on which a color-adjusted image is output in a dot-matrix pixel form. In this sequence, the color-adjusted image data delivered by the color adjustment device 80 is produced through judging an object and color of image according to chromaticity of each pixel and determining a principle and degree of optimum color adjustment in terms of color correction of an entire image. For this purpose, the color adjustment device 80 comprises the unit for judging chromaticity, the unit for statistical calculation of object chromaticity pixels, the unit for judging a degree of color adjustment, and the unit for adjusting color.

Figure 26:
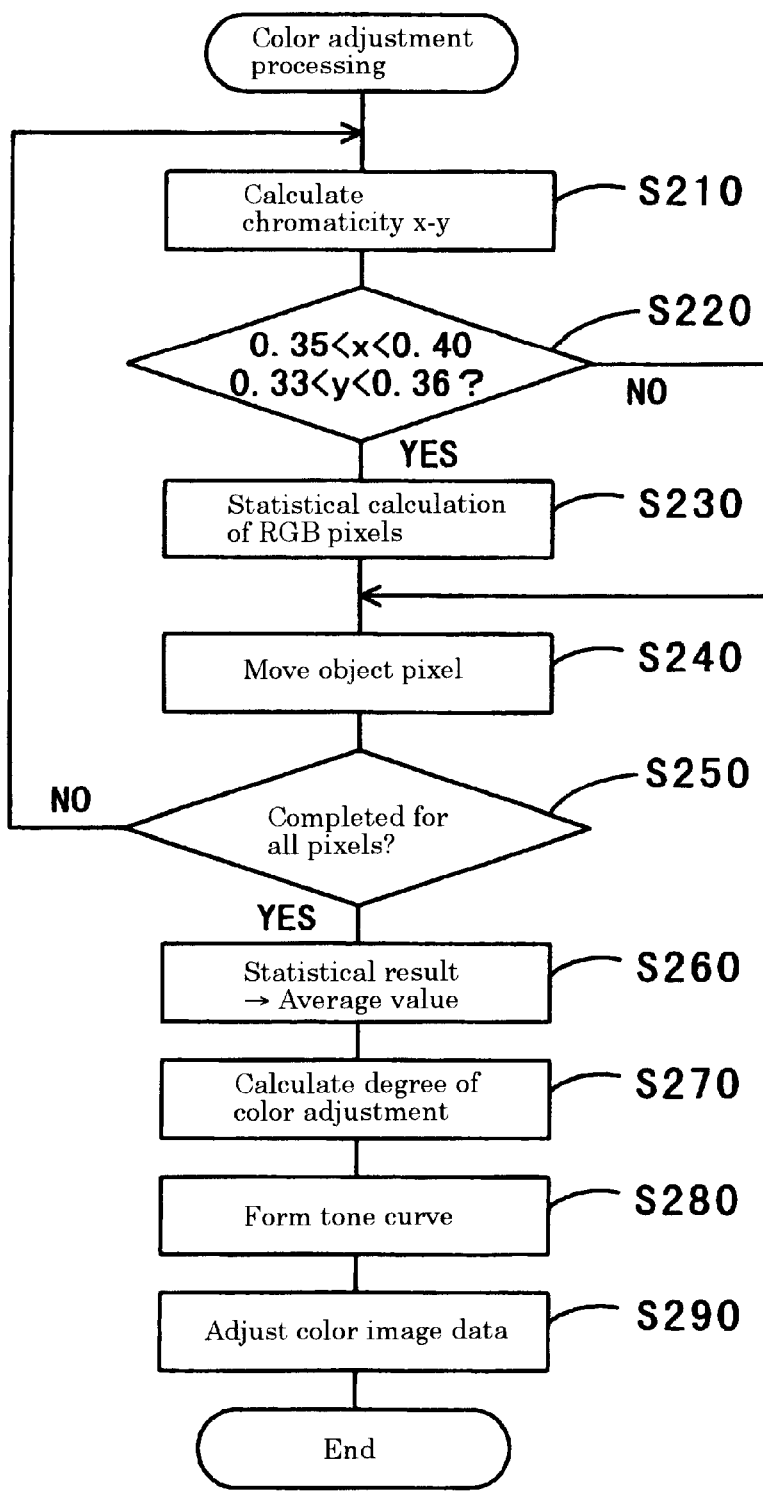
FIG. 26 is a flowchart of color adjustment processing in the color adjustment device according to the present invention.

To be more specific, judgment on an object and color adjustment thereof are carried out by a color adjustment processing program as flowcharted in FIG. 26, which is run on the computer 21. Note that a flowchart exemplified in FIG. 26 is for color adjustment processing to provide clear flesh color.

In the color adjustment processing, statistical calculation is performed on flesh-color-like pixels according to chromaticity of each pixel. As shown in FIG. 6, each object pixel is moved for statistical calculation on all the pixels.

First, at step S210, chromaticity "x-y" of each pixel is calculated. As in the case of the example in the foregoing description, flesh color is identified if the following expressions are satisfied.

$$0.35 < x < 0.40 \quad (5)$$

$$0.33 < y < 0.36 \quad (6)$$

At step S220, it is judged whether or not chromaticity "x-y" converted according to each pixel of RGB gradation data is in a predefined flesh color range. If it is in the flesh color range, statistical calculation is performed on each pixel of color image data at step S230. This statistical calculation signifies simple addition of RGB gradation data values. The number of pixels is also counted to determine an average value for pixels judged to have flesh color, which will be described in detail later.

Thereafter, regardless of whether or not each object pixel is judged to have flesh color, each object pixel is moved at step S240. Thus, the above-mentioned sequence is repeated until it is judged at step S250 that processing for all the pixels is completed. On completion of processing for all the pixels, step S260 is performed to divide statistical result data by the number of pixels for determining an average value (Rs.ave, Gs.ave, Bs.ave).

Software processing for "x-y" chromaticity calculation at step S210 and hardware for execution thereof provide the unit for judging chromaticity. It is judged at step S220 whether or not chromaticity "x-y" is in a predetermined object range, and if the predetermined object range is satisfied, statistical calculation is performed on color image data at step S230. Then, at steps S240 and S250, each object pixel is moved until all the pixels are taken. At step S260, statistical result is divided by the number of pixels to determine an average value. These software processing operations and hardware for execution thereof provide the unit for statistical calculation of object chromaticity pixels.

As to pixels having preferable flesh color, an ideal value (Rs. ideal, Gs.ideal, Bs. ideal) is predefined. In terms of memory color in psychology, each ideal value is different from result of actual measurement. In an example of flesh color, a person tends to have an optical illusion that slightly deviated flesh color is true rather than flesh color conforming to actual measurement result. This optical illusion is based on a stereotyped recognition of flesh color on photographs and pictures, i.e., it is referred to as a memory color effect in psychology. In the present invention, an ideal value is predefined in consideration of such a memory color effect so that color adjustment is made to eliminate a difference from the ideal value. Therefore, the ideal value may be in a wide target range expected without being biased to actual color.

Regarding flesh color pixels, a difference between an average value (Rs.ave, Gs.ave, Bs.ave) of RGB gradation data and an ideal value (Rs.ideal, Gs.ideal, Bs.ideal) predefined for preferable flesh color represents a degree of deviation in color image data fundamentally.

However, it is not preferred to apply the difference as a degree of color adjustment intactly. For instance, if the same degree of color adjustment is applied to all the pixels, a flesh color part may become satisfactory but colors of pixels on any parts other than the flesh color part may be affected significantly.

In the present preferred embodiment, therefore, a ratio of the number of flesh color pixels to the total number of pixels (flesh color ratio) is determined at step S270 for regulating a degree of color adjustment. Degrees of adjustment of primary colors $\Delta R$, $\Delta G$ and $\Delta B$ are expressed as shown below.

$$\Delta R = ks \ (Rs.\text{ideal} - Rs.\text{ave}) \quad (55)$$

$$\Delta G = ks \ (Gs.\text{ideal} - Gs.\text{ave}) \quad (56)$$

$$\Delta B = ks \ (Bs.\text{ideal} - Bs.\text{ave}) \quad (57)$$

Based on these equations, a value of flesh color ratio 'ks' is attained as indicated below.

$$ks = (\text{Number of flesh color pixels/Total number of pixels})$$

Figure 27:
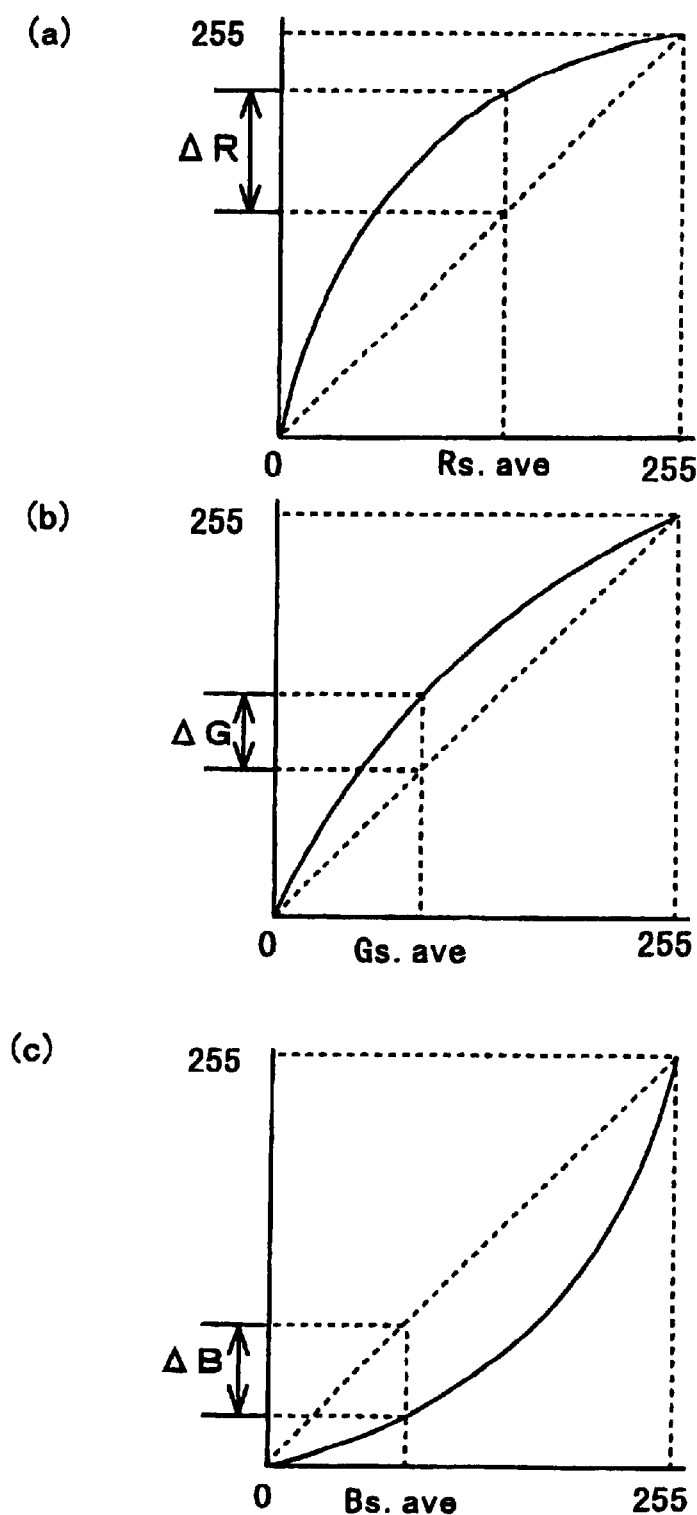
FIGS. 27(a)–(c) are diagrammatic illustrations showing tone cures for converting gradation data with predetermined degrees of enhancement.

A degree of color adjustment thus attained is not applied intactly to color image data adjustment. In the present preferred embodiment, a tone curve is prepared using the degree of color adjustment at step S280. FIG. 27 is a diagrammatic illustration showing tone curves prepared in the present embodiment.

A tone curve represents an input-output relationship where RGB gradation data is converted with a degree of enhancement regulated. In an example of 256 gradations ranging from levels '0' to '255', a spline curve is drawn with respect to three identified output value points corresponding to gradation level gradation level '255' and a certain medium gradation level therebetween. Assuming that medium gradation level '64' is taken and output values are '0', '64' and '255', there is a coincidence in an input-output relationship even if input values are '0', '64' and '255', resulting in a tone curve being straightened. However, if output value '64' is not provided for input value '64', a gentle curve as shown in FIG. 27 is drawn to set up an input-output relationship. In the present preferred embodiment, a control point corresponding to the average value (Rs.ave, Gs.ave, Bs.ave) of RGB gradation data is used as a medium gradation level, and respective degrees of color adjustment $\Delta R$, $\Delta G$ and $\Delta B$ are reflected in formation of a tone curve. In this fashion, the control point is changed so that each ideal value (Rs.ideal, Gs.ideal, Bs.ideal) is met when the flesh color ratio 'ks' is '1'.

At step S290, element colors of color image data are converted for all the pixels again using a tone curve thus attained to accomplish color adjustment of the color image data.

Software processing at step S270 where color adjustment is made according to a ratio of the number of object pixels to the total number of pixels while determining a difference between a statistical result value and an ideal value, software processing at step S280 where a tone curve is formed according to a determined degree of color adjustment, and hardware for execution thereof provide the unit for judging a degree of color adjustment. Software processing at step S290 where color image data is converted and hardware for execution thereof provide the unit for adjusting color.

Figure 28:
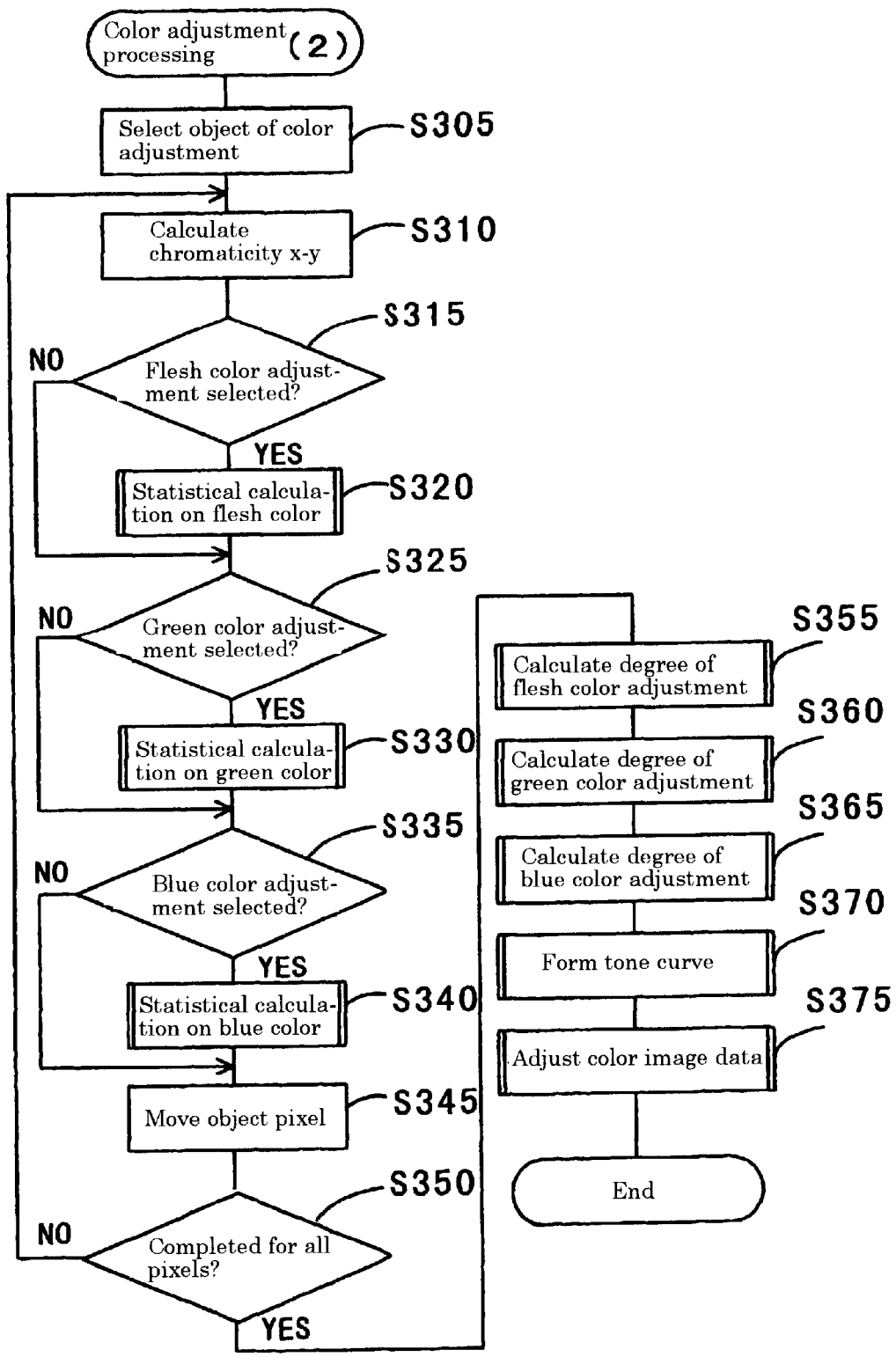
FIG. 28 is a flowchart of color adjustment processing in a modified embodiment according to the present invention.

Having described the present preferred embodiment as related to flesh color adjustment for the purpose of simplicity in explanation, it is to be understood that color adjustment is not limited to flesh color. In consideration of a memory color effect in psychology, it is often desired to attain more vivid green color of tree leaves and clearer blue color of sky in addition to clearer flesh color through color adjustment processing. Referring to FIG. 28, there is shown a modified embodiment in which an object of adjustment is selectable.

In the example shown in FIG. 28, an object of color adjustment is selected first at step S305. In use of the computer 21, a window shown in FIG. 29 is presented on the display monitor 32 so that a human operator can select an object of color adjustment. The window exemplified in FIG. 29 is provided with a flesh color adjustment item for clearer flesh color, a green color adjustment item for more vivid green color of tree leaves, and a blue color adjustment item for clearer sky blue, each of which has a check box for allowing individual selection. In this example, duplicate selection is also permitted. When the operator turns on a desired check box and click the 'OK' button, a flag for each object thus specified is set up to start a loop processing of steps S310 to S350.

In the loop processing, while moving an object pixel, statistical calculation is performed on each pixel through determining chromaticity as in the foregoing description. At step S310, object pixel chromaticity "x-y" is determined using Equations (1) to (4). Then, at step S315, a flesh color adjustment flag which has been set up at step S305 is referenced to judge whether or not the operator has selected the flesh color adjustment item. If it has been selected, statistical processing for flesh color pixels is performed. This statistical processing is carried out in the same manner as at steps S220 and S230 in the previous example. If chromaticity "x-y" determined at step S310 is in a predefined possible chromaticity range corresponding to flesh color, statistical calculation is performed for each element color of RGB gradation data.

At step S325, a green color adjustment flag is referenced to judged whether or not the operator has selected the green color adjustment item in the same manner as for flesh color adjustment. If the green color adjustment item has been selected, object pixel chromaticity "x-y" is checked to judge whether or not it is in a predefined possible chromaticity range corresponding to green color of tree leaves. If it is in the corresponding predefined chromaticity range, statistical calculation is performed at step S330. This statistical calculation is carried out in an area different from that subjected to flesh color statistical calculation.

Then, at step S335, the blue color adjustment item is checked to form a judgment in the same manner, and at step S340, statistical calculation is performed on another area.

At step S345, each object pixel is moved, and the above-mentioned sequence is repeated until it is judged at step S350 that processing for all the pixels is completed. In this modified embodiment, a plurality of objects may be selected for color adjustment. Even in such a situation, statistical calculation is performed at steps S315 to S340 if chromaticity of each object pixel is in a predefined chromaticity range. Therefore, these processing operations provide the unit for statistical calculation of object chromaticity pixels.

At steps S355 to S365 after completion of chromaticity statistical calculation on all the pixels, a degree of adjustment for each color is calculated according to result of statistical calculation. Unlike the previous example, a processing operation for determining an average value from statistical calculation result is performed simultaneously with calculation of a degree of each color adjustment in this modified embodiment, and it is possible to modify relevant calculation procedures as required. As described in the previous example, each adjustment of flesh color, green color and blue color is carried out in the same manner. That is, an average value is calculated according to statistical calculation result, a difference between it and an ideal value predefined for preferable color is determined, and multiplication by a flesh color ratio, green color ratio or blue color ratio is performed for regulating a degree of each color adjustment.

Upon completion of step S365, there are provided three kinds of degrees of color adjustment since degrees of flesh color adjustment, green color adjustment and blue color adjustment have been determined through respective statistical calculations. Therefore, in the modified embodiment, addition is performed to reflect results of these statistical calculations inclusively. More specifically, in a situation of wider application of processing objects, degrees of color adjustment for respective processing objects ΔR, ΔG and B are determined as expressed below.

$$\Delta R = \sum_i ki(Ri \cdot ideal - Ri \cdot ave) \qquad (58)$$

$$\Delta G = \sum_i ki(Gi \cdot ideal - Gi \cdot ave) \qquad (59)$$

$$\Delta B = \sum_i ki(Bi \cdot ideal - Bi \cdot ave) \qquad (60)$$

where $$\sum_i ki <= 1 \qquad (61)$$

$i = 1$: flesh color $i = 2$: green color $i = 3$: blue color

In this case, it is assumed that no duplicate counting is made.

At step S370, a tone curve is formed according to each of degrees of color adjustment ΔR, ΔG and ΔG thus determined, as shown in FIG. 27. In this case, control points are indicated by Σ ki·Ri.ave, Σ ki·Gi.ave, Σ ki·Bi.ave. Software processing operations at steps S355 to S370 provide the unit for judging degree of color adjustment. After formation of each tone curve, color image data is adjusted at step S375.

The above-mentioned color adjustment device may also be implemented as a printer driver. In most cases, a printer driver is not capable of temporarily storing data in an output process after processing of input data. Hence, there is a certain limitation in functionality for changing processing conditions according to each region divided as desired. However, by setting up degrees of color adjustment for a plurality of elements as shown in Equations (58) to (60), it is possible to carry out effective color adjustment even for the printer driver having such a functional limitation.

The following describes operations of a preferred embodiment arranged with a printer driver.

Figure 30:
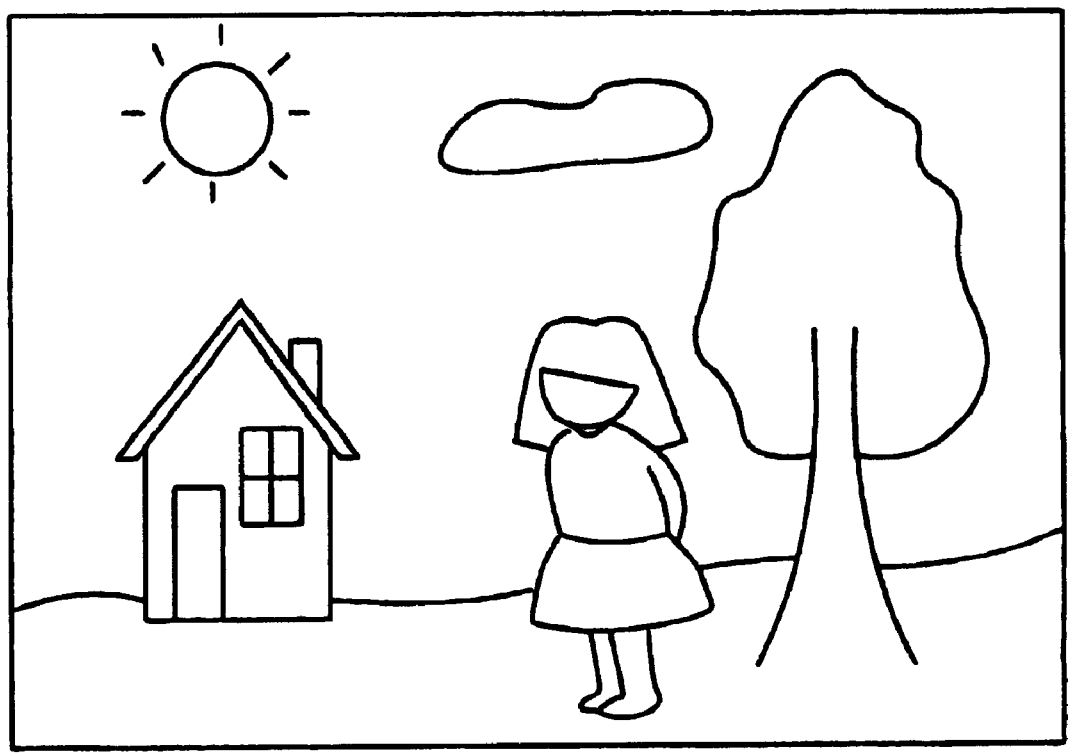
FIG. 30 is a diagram illustrating an original photographic image to be subjected to the color adjustment processing.

As in the previous exemplary embodiment, it is assumed that a photographic color image shown in FIG. 30 is read in using the scanner 11 and printed out using the printer 31. First, under condition that the operating system 21a is run on the computer 21, the color adjustment application 21d is launched to let the scanner 11 read in the photographic image. When the photographic image thus read in is taken into the color adjustment application 21d under control of the operating system 21a, an object pixel applicable to processing is set at an initial position. Then, at step S210, chromaticity "x-y" of each pixel is calculated using Equations (1) to (4). At step S220, it is judged whether or not each of values 'x' and 'y' is in a predefined flesh color chromaticity range. If it is in the flesh color chromaticity range, statistical calculation is performed on each pixel of color image data for each element color at step S230. In the photographic image shown in FIG. 30, pixels of person's hands, legs or face can be judged to have flesh color. In this example, statistical calculation is performed on a few percent of all the pixels as flesh color pixels. Then, at step S240, each object pixel is moved. Thus, the above-mentioned sequence is repeated until it is judged at step S250 that processing for all the pixels is completed. After completion of processing for all the pixels, statistical result data is divided by the number of flesh color pixels to determine an average value at step S260. At step S270, a difference between an ideal value of flesh color and the average value of flesh color pixels is determined, and it is multiplied by a flesh color ratio that represents a ratio of the number of flesh color pixels to the total number of pixels. At step S280, a tone curve is formed accordingly. Then, at step S290, based on the tone curve, each element color of color image data is converted for color adjustment. Since a degree of color adjustment is set at a moderate level with respect to the ideal value of flesh color in consideration of the ratio of the number of flesh color pixels to the total number of pixels, preferable color can be attained through proper color adjustment.

In the example shown in FIG. 30, a difference between an average value of flesh color pixels attained in statistical calculation and an ideal value of flesh color is multiplied by a flesh color ratio indicating a few percent value for regulating a degree of color adjustment. According to the regulated degree of color adjustment, a tone curve is formed for accomplishing color adjustment.

Still more, if a flesh color adjustment item, green color adjustment item and blue color adjustment item are selected in adjustment object selection as exemplified before, chromaticity "x-y" is calculated for all the pixels at step S310. Then, at steps S315 to S340, individual statistical calculation is performed for each adjustment object. In the example shown in FIG. 30, on a flesh color part of a person's image, a green color part of tree leaves and a sky-blue part of a background, each chromaticity "x-y" is applicable to each object range for statistical calculation.

After completion of processing for all the pixels, a degree of color adjustment for each object is determined in consideration of an occupancy ratio of object pixels at steps S355 to S365. At step S370, a tone curve is formed through regulating each degree of color adjustment thus determined. Then, at step S375, color adjustment is carried out for all the pixels of color image data. In this manner, flesh color adjustment for attaining clearer flesh color, green color adjustment for attaining more vivid green color of tree leaves, and blue color adjustment for attaining clearer sky blue in background are carried out through regulation according to the occupancy ratio of object pixels of each color.

After color adjustment thus accomplished, a color image is displayed on the display monitor 32 through the display driver 21c, and then if the color image thus displayed is satisfactory, it is printed out onto the printer 31 through the printer driver 21b. More specifically, the printer driver 21b receives RGB gradation image data which has been subjected to color adjustment, performs resolution conversion as predetermined, and carries out rasterization according to a print head region of the printer 31. Then, the image data thus rasterized is subjected to RGB-to-CMYK color conversion, and thereafter, CMYK gradation image data is converted into binary image data for output onto the printer 31.

Through the above-mentioned processing, the photographic color image read in using the scanner 11 is automatically subjected to optimum color adjustment. Thereafter, it is displayed on the display monitor 32, and then printed out onto the printer 31.

As set forth hereinabove, on the computer serving as the nucleus of color adjustment, chromaticity "x-y" of each pixel is calculated at step S210, and statistical calculation is performed at steps S220 to S230 if a value of chromaticity thus calculated is in a chromaticity range predefined for each color. After completion of statistical calculation on all the pixels, an average value is determined at step S260, and a degree of each color adjustment is calculated while taking account of an occupancy ratio of object pixels of each color at step S270. In this fashion, accurate statistical calculation is performed on color pixels to be adjusted independently of brightness, and a degree of each color adjustment is regulated by taking account of the number of pixels of each color in terms of occupancy ratio, thereby making it possible to carry out optimum color adjustment processing without giving an adverse effect on colors of pixels surrounding object pixels.

The invention may be embodied in other specific forms without departing from the spirit or essential characteristics thereof. The present embodiments are therefore to be considered in all respects as illustrative and not restrictive, the scope of the invention being indicated by the appended claims rather by the foregoing description and all changes which come within the meaning and range of equivalency of the claims are therefore intended to be embraced therein.

What is claimed is:

1. A color adjustment device for performing color separation of color image data for each predetermined element color and adjusting said color image data in enhancement to provide each desired color in result of color image output delivered for each element color by an image output device, comprising:

a chromaticity judging unit which determines a value of chromaticity of each pixel according to said color image data;

an object chromaticity pixel statistical calculation unit which performs statistical calculation on pixels having chromaticity values determined, by said chromaticity judging unit, to meet a predetermined range of chromaticity;

a color adjustment degree judging unit which determines a degree of color adjustment so as to eliminate a difference between a predetermined optimum value for pixels meeting said predefined range of chromaticity and a result value attained in said statistical calculation and for regulating said degree of color adjustment according to an occupancy ratio of pixels subjected to said statistical calculation to the total number of pixels; and color adjusting unit which carries out color adjustment of said image data according to the regulated degree of color adjustment;

wherein, for each given pixel of the color image data:
said chromaticity judging unit determines a value of chromaticity of said given pixel,
when said judged value of chromaticity of said given pixel meets a predetermined range of chromaticity, the object chromaticity pixel statistical calculation unit performs a statistical calculation with respect to the given pixel;
after said statistical calculation, said color adjustment degree judging unit determines a degree of color adjustment, and regulates said degree using an occupancy ratio of the number of pixels subjected to said statistical calculation to the total number of pixels;

after regulating said degree of color adjustment, said color adjusting unit carries out color adjustment on said image data of said given pixel according to the regulated degree of color adjustment.

2. A color adjustment device as claimed in claim 1, wherein:

in said object chromaticity pixel statistical calculating unit, an average value of pixels judged to be object pixels being calculated for each element color of color image data; in said color adjustment degree judging unit, an optimum value of each element color being provided for color image data meeting said predefined range of chromaticity, and a degree of color adjustment being determined according to said optimum value of each element color.

3. A color adjustment device as claimed in claim 1, wherein, in said chromaticity pixel statistical calculating unit, statistical calculation being performed on object chromaticity pixels in a possible range of chromaticity in terms of memory color in psychology.

4. A color adjustment device as claimed in claim 1, wherein, in a color adjustment degree judging unit, a tone curve representing input-output relationship information being used for changing a degree of element color enhancement, and a tone curve being formed according to said degree of color adjustment.

5. A color adjustment method of performing color separation of color image data for each predetermined element color and adjusting said color image data in enhancement to provide each desired color in result of color image output delivered for each element color by an image output device, comprising:

for each given pixel of the color image data, determining a value of chromaticity of said given pixel;

when said judged value of chromaticity of said given pixel meets a predetermined range of chromaticity, performing a statistical calculation with respect to the given pixel;

after said statistical calculation, determining a degree of color adjustment so as to eliminate a difference between:
  a predetermined optimum value for pixels meeting said predefined range of chromaticity, and
  a result value attained in said statistical calculation;

regulating said degree using an occupancy ratio of the number of pixels subjected to said statistical calculation to the total number of pixels; and after regulating said degree of color adjustment, carrying out color adjustment on said image data of said given pixel according to the regulated degree of color adjustment.

6. A storage medium for recording a color adjustment control program for performing color separation of color image data for each predetermined element color on a computer and adjusting said color image data in enhancement to provide each desired color in result of color image output delivered for each element color by an image output device, comprising the steps of:

for each given pixel of the color image data, determining a value of chromaticity of said given pixel;

when said judged value-of chromaticity of said given pixel meets a predetermined range of chromaticity, performing a statistical calculation with respect to the given pixel;

after said statistical calculation, determining a degree of color adjustment so as to eliminate a difference between:
  a predetermined optimum value for pixels meeting said predefined range of chromaticity, and
  a result value attained in said statistical calculation;

regulating said degree using an occupancy ratio of the number of pixels subjected to said statistical calculation to the total number of pixels; and after regulating said degree of color adjustment, carrying out color adjustment on said image data of said given pixel according to the regulated degree of color adjustment.

* * * * *